United States Patent
Urban

(10) Patent No.: US 10,525,389 B2
(45) Date of Patent: *Jan. 7, 2020

(54) SLUDGE CONCENTRATOR ASSEMBLY WITH VARYING FIRST STAGE SEPARATOR, COMBINED WITH A SECOND STAGE, CLEAN FLOW OUTLET INCORPORATING FIXED AND VARIABLE FLOW RESTRICTOR ORIFICES

(71) Applicant: JK Industries, LLC, Troy, MI (US)

(72) Inventor: Keith Urban, Waterford, MI (US)

(73) Assignee: JK Industries, LLC, Troy, MI (US)

( * ) Notice: Subject to any disclaimer, the term of this patent is extended or adjusted under 35 U.S.C. 154(b) by 1032 days.

This patent is subject to a terminal disclaimer.

(21) Appl. No.: 14/993,691

(22) Filed: Jan. 12, 2016

(65) Prior Publication Data

US 2016/0121248 A1 May 5, 2016

Related U.S. Application Data

(63) Continuation-in-part of application No. 13/742,990, filed on Jan. 16, 2013, now Pat. No. 9,233,866.

(Continued)

(51) Int. Cl.
*B01D 36/00* (2006.01)
*B04C 9/00* (2006.01)
(Continued)

(52) U.S. Cl.
CPC .......... *B01D 36/045* (2013.01); *B01D 29/114* (2013.01); *B01D 29/66* (2013.01); *B01D 35/12* (2013.01); *B01D 35/1573* (2013.01);
*B01D 35/1576* (2013.01); *B01D 36/003* (2013.01); *C02F 1/38* (2013.01); *B04C 5/181* (2013.01); *B04C 2009/002* (2013.01); *C02F 11/127* (2013.01); *C02F 2103/16* (2013.01); *C02F 2209/005* (2013.01); *C02F 2209/40* (2013.01)

(58) Field of Classification Search
None
See application file for complete search history.

(56) References Cited

U.S. PATENT DOCUMENTS

| 3,685,721 A | 8/1972 | Kohama |
| 4,224,043 A | 9/1980 | Dupre |

(Continued)

FOREIGN PATENT DOCUMENTS

| FR | 998240 A | * | 1/1952 |
| GB | 789670 A | | 1/1958 |

(Continued)

*Primary Examiner* — Thomas M Lithgow
(74) *Attorney, Agent, or Firm* — Dinsmore & Shohl LLP

(57) ABSTRACT

A dual stage filter assembly for use in a fluid cleaning and sludge removal operation, including a first stage separator incorporated into a first vessel and receiving a dirty fluid flow, a first stage clean fluid outlet extending from the first stage separator. A second stage filter is incorporated into a second vessel in fluidic communication with a dirty fluid outlet of the first stage separator for subsequent filtering and outflow through a second stage clean outlet. A flow restrictor is incorporated into said second stage clean outlet for controlling a flow rate through said filter in order to prevent clogging of the same by aggregating debris.

19 Claims, 22 Drawing Sheets

Related U.S. Application Data

(60) Provisional application No. 61/586,957, filed on Jan. 16, 2012.

(51) Int. Cl.

| | | |
|---|---|---|
| *B01D 36/04* | (2006.01) | |
| *B01D 35/12* | (2006.01) | |
| *B01D 35/157* | (2006.01) | |
| *C02F 1/38* | (2006.01) | |
| *B01D 29/11* | (2006.01) | |
| *B01D 29/66* | (2006.01) | |
| *C02F 11/127* | (2019.01) | |
| *C02F 103/16* | (2006.01) | |
| *B04C 5/181* | (2006.01) | |

(56) References Cited

U.S. PATENT DOCUMENTS

| | | |
|---|---|---|
| 4,581,009 A | 4/1986 | Kramer |
| 4,759,744 A | 7/1988 | Krook |
| 4,915,681 A | 4/1990 | Suzuki |
| 4,975,188 A | 12/1990 | Brunsell et al. |
| 5,267,936 A | 12/1993 | Miachon |
| 6,508,752 B1 | 1/2003 | Hallgren et al. |
| 6,572,524 B1 | 6/2003 | Caldwell |
| 6,966,874 B2 | 11/2005 | Cornay et al. |
| 7,153,255 B2 | 12/2006 | Gillengerten et al. |
| 7,887,611 B2 | 2/2011 | Asal et al. |
| 8,617,405 B2 * | 12/2013 | Hopper .............. B01D 17/0217 210/787 |
| 9,233,866 B2 * | 1/2016 | Urban .................. B01D 36/003 |
| 2009/0223875 A1 | 9/2009 | Asal et al. |
| 2010/0135769 A1 | 6/2010 | Kleynhans et al. |

FOREIGN PATENT DOCUMENTS

| | | | |
|---|---|---|---|
| GB | 1087565 A | | 10/1967 |
| GB | 1122876 A | | 8/1968 |
| GB | 1309442 A | | 3/1973 |
| GB | 2092483 A | | 8/1982 |
| SE | 154934 | * | 6/1956 |
| WO | WO 2007/144631 A2 | * | 12/2007 |

* cited by examiner

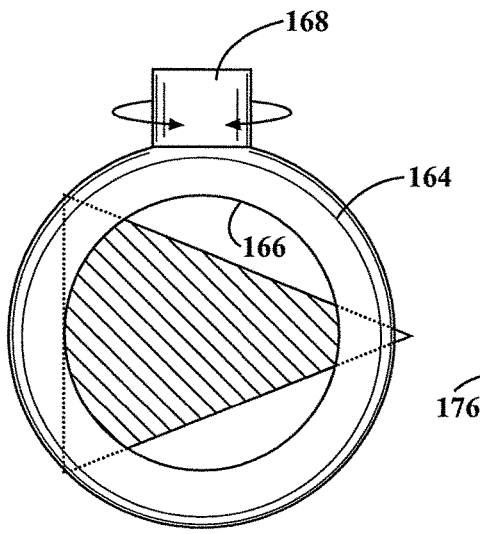
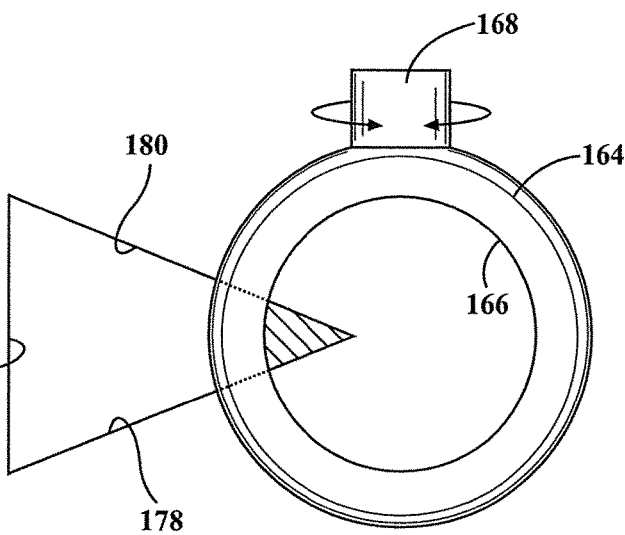
FIG. 18A  FIG. 18B
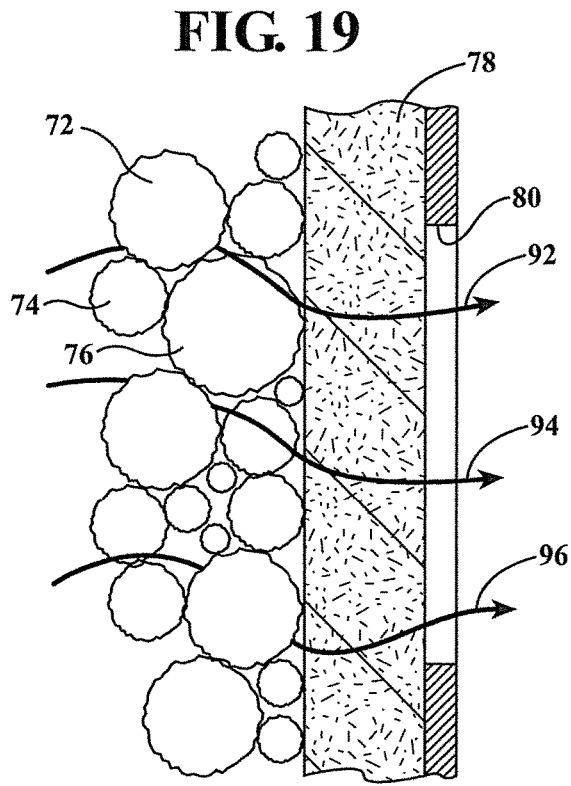
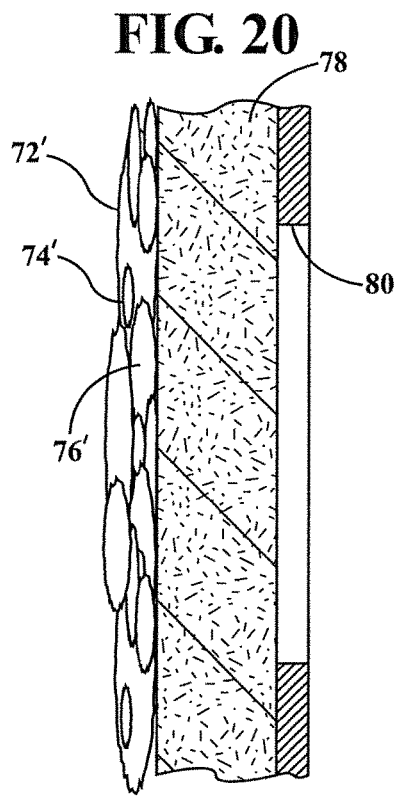
FIG. 19  FIG. 20
LOW VELOCITY  HIGH VELOCITY

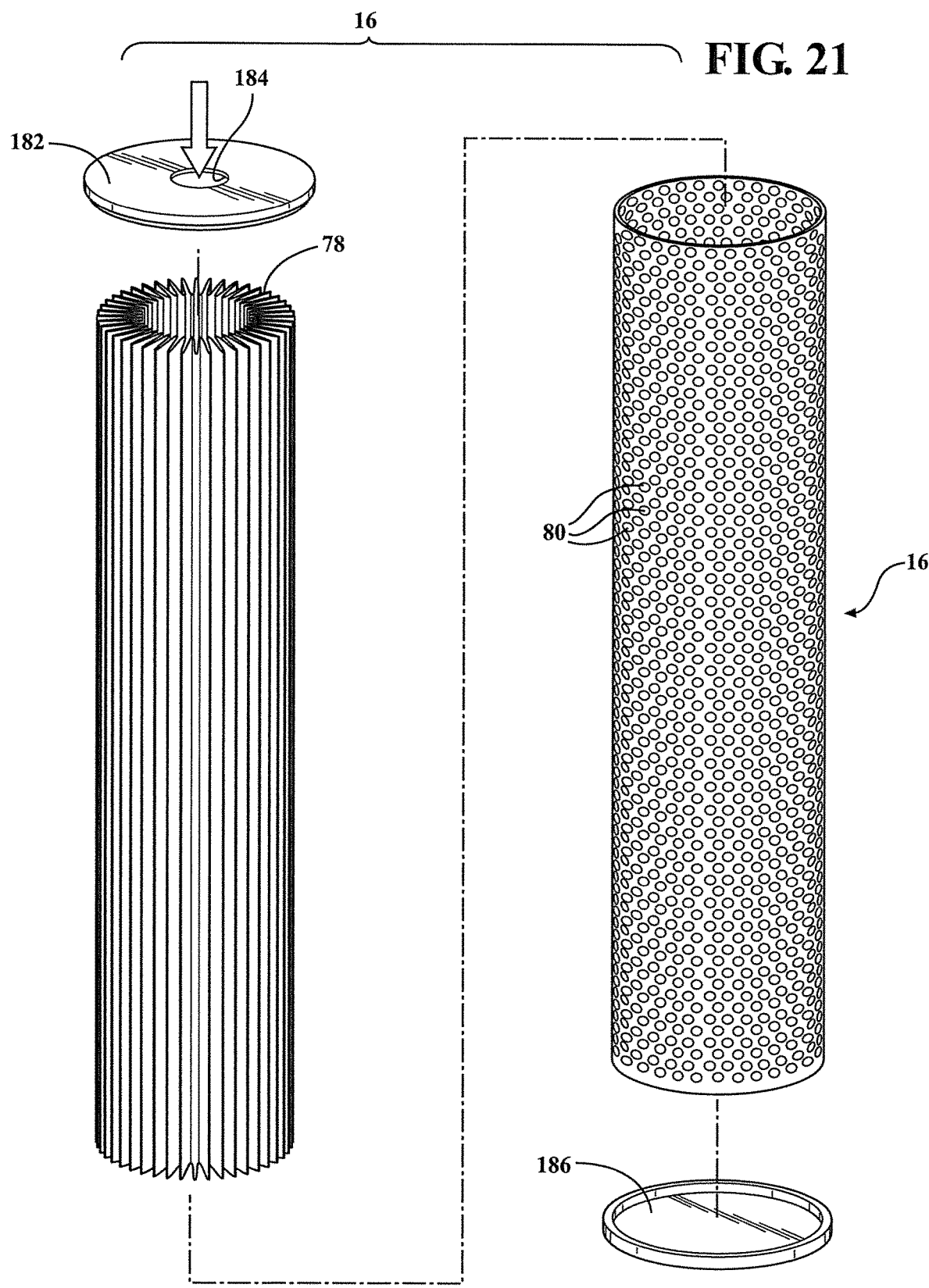

SLUDGE CONCENTRATOR ASSEMBLY WITH VARYING FIRST STAGE SEPARATOR, COMBINED WITH A SECOND STAGE, CLEAN FLOW OUTLET INCORPORATING FIXED AND VARIABLE FLOW RESTRICTOR ORIFICES

CROSS-REFERENCE TO RELATED APPLICATIONS

This application is a Continuation-in-part of application Ser. No. 13/742,990 filed on Jan. 16, 2013. application Ser. No. 13/742,990 claims the benefit of U.S. Provisional Application 61/586,957 filed on Jan. 16, 2012, the contents of which are incorporated in their entirety.

FIELD OF THE INVENTION

The present invention discloses a two stage sludge concentrator assembly incorporating upper centrifugal and lower barrier filter components for providing enhanced sludge separation and removal combined with both high and low flow clean outlets. The invention also discloses a variety of fixed and variable orifice flow restrictors associated with the second stage clean outlet, and which are calibrated in order to control flow rate through the second/lower stage filter to prevent clogging of the same before being fully filled and replaced.

BACKGROUND OF THE INVENTION

The prior art discloses examples of centrifugal separator assemblies for separating solid particles from a liquid. Examples of these include the separator constructions disclosed in each of Hallgren U.S. Pat. No. 6,508,752 and Brunsell U.S. Pat. No. 4,975,188 and Kramer U.S. Pat. No. 4,581,009.

Other examples include the decanter centrifuge of Caldwell U.S. Pat. No. 6,572,524 incorporating a heavy phase solids baffle in the form of a radially extending and spiraling disc extending outwardly from a conveyor hub and adapted for projecting into a separated heavy phase material conveyed along a bowl wall.

Suzuki U.S. Pat. No. 4,915,681 discloses a centrifugal separator with continuous discharge incorporating a rotating bowl having a slurry inlet orifice, a sludge discharge port and a liquid discharge port. A screw is positioned concentrically inside the rotating bowl for rotating in the same direction as the bowl at a different speed. At least one baffle plate is provided within the pitch of the screw and is immersed in the liquid separated and accumulated in the rotating bowl in the main section in which the solid/liquid separation is carried out.

SUMMARY OF THE INVENTION

The present invention discloses a dual stage filter assembly for use in a fluid cleaning and sludge removal operation. The assembly includes an upper stage centrifugal separator incorporated into a first vessel. A lower stage baffle filter is incorporated into a second vessel, such that a dirty fluid flow delivered to the upper stage separator includes a clean outlet along with a separate dirty outlet which is delivered to an inlet of the lower stage filter for subsequent filtering and outflow.

Additional features include a convex collection element configured at a bottom location of the upper stage separator for facilitating delivery of dirty fluid to the lower stage filter and including at least one of a removable separator plate or cone shaped element. An ascending pipe extends from the upper separator and evacuates a clean fluid flow resulting from a negative pressure created within the upper separator.

Other features include a pair of lower baffle filters selectively communicated to the upper separator via a directional valve integrated into a common fluid collection hub located underneath the convex collection element. The valve configuration is such that it is displaceable between first and second positions in order to selectively direct the downward and dirty outlet flow from the upper centrifugal stage to either of first and second lower positioned pairs of baffle filters. A common mounting post is provided for supporting the pair of lower baffle filter vessels in selective descending and fluidic disengaging and rotatable opening fashion, this in order to facilitate replacement of a polluted baffle filter concurrent with maintaining continued filtering operation through the other baffle filter.

Additional embodiments include the provision of a flow restrictor located at the second stage clean fluid outlet for. The flow restrictor can include both fixed and variable embodiments and controls the pressure, and correspondingly both the velocity and associated forces, exerted upon the filtered debris during accumulation within the second stage baffle filter. In this fashion, the second stage baffle filter can be permitted to more fully be filled by debris prior to replacement.

Other embodiments include the first stage centrifugal separator being provided as an additional baffle filter. A backwash or purge feature can also be built into a further modification of the present assembly and which can provide for iterative cleaning cycles in order to extend the life of the first and/or second stage baffle filters.

BRIEF DESCRIPTION OF THE DRAWINGS

Reference will now be made to the attached drawings, when read in combination with the following detailed description, wherein like reference numerals refer to like parts throughout the several views, and in which:

FIG. 18A is a sectional plan view of the ball valve subassembly of FIG. 17 and better showing the overlapping profile established between the circular through channel in the ball and the triangular outlet in a fully opened configuration;

FIG. 18B is a further sectional plan view of the subassembly in FIG. 17 and illustrating a partially open condition established between the overlapping profiles, this in order to maintain a higher degree of flow adjustable control to account for a minimal percentage of overlapping surface area (e.g. 30%) corresponding to a fully flow permitting condition;

FIG. 19 is a partial plan cutaway of a collection interface established between accumulating debris particles and a second stage baffle filter with a desired flux rate, corresponding to a flow rate defined as Gallons per Minute (GPM) per square foot of filter media and generally correlating to a fluid velocity and associated measure of energy of the debris being impacted against the filter media surface, being shown in a first fluid flow allowing condition;

FIG. 20 is a further illustration taken from FIG. 19 and illustrating the result of an excessive flux rate condition resulting in higher force/impact of debris against the filter media, thereby resulting in clogging of the filter and resulting in the need for replacement of the filter before the same is fully filled with captured debris;

FIG. 21 is an exploded view of the baffle filter also depicted in FIG. 4B;

DETAILED DESCRIPTION OF THE PREFERRED EMBODIMENTS

As previously described, the present invention discloses a two stage sludge concentrator assembly incorporating upper centrifugal and lower barrier filter components for providing enhanced sludge separation and removal combined with both high and low flow clean outlets. As will be described in further detail with reference to the succeeding illustrations, the dual stage sludge concentrator assembly can be integrated into any suitable machining or metal working operation, as well as any of a number of non-limiting cleaning or other processing operations associated with the production or conditioning of parts. Regardless of application, the dual stage assembly operates to clean or recondition an outlet fluid by the removal of any or all of oils, metal shavings, dirt, sludge, aggregates or other contaminants.

Figure 1:
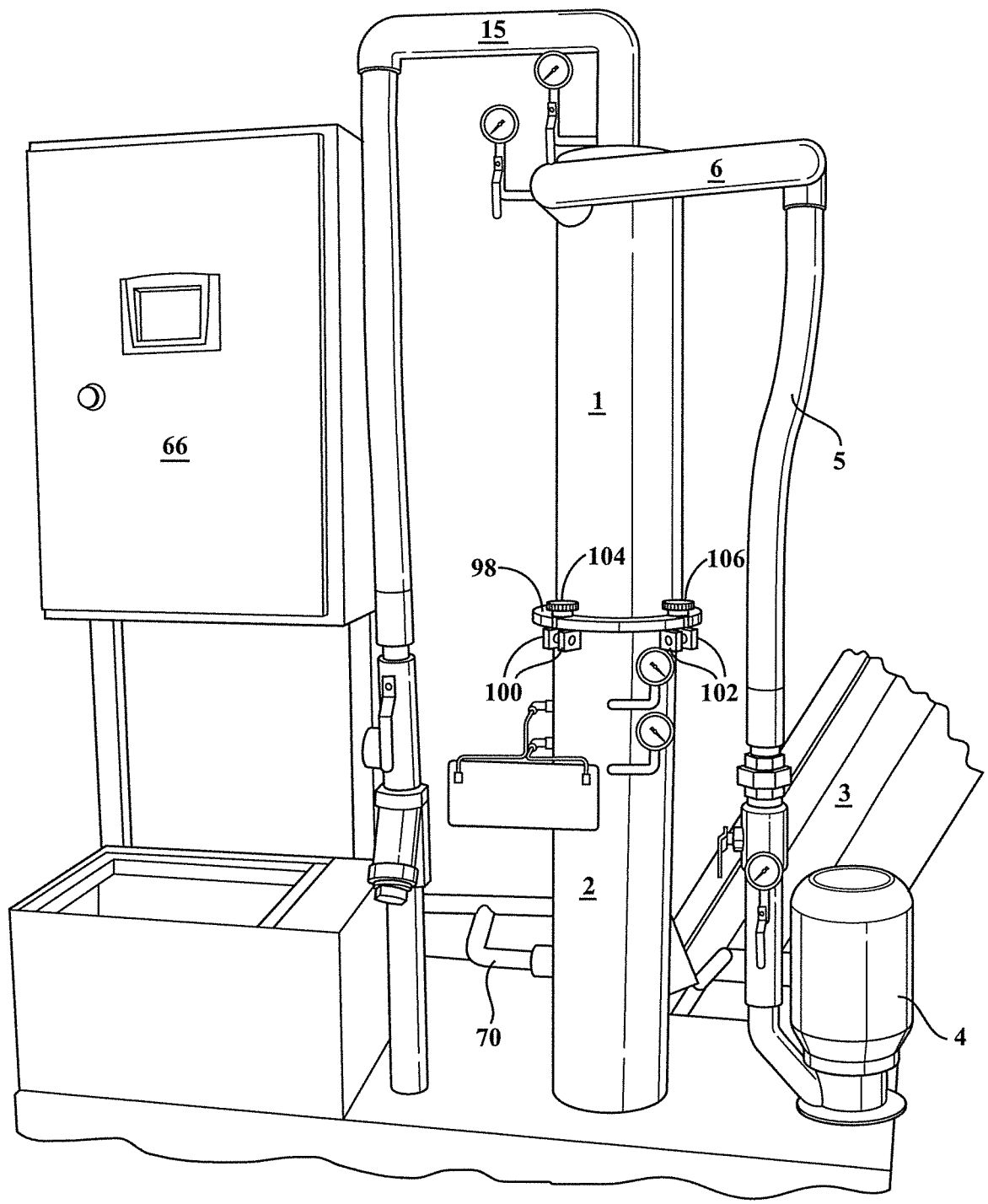
FIG. 1 is an operational view of the two stage sludge concentrator assembly according to the present invention and including first upper centrifugal separator and second lower baffle filter subassemblies.
Figure 2:
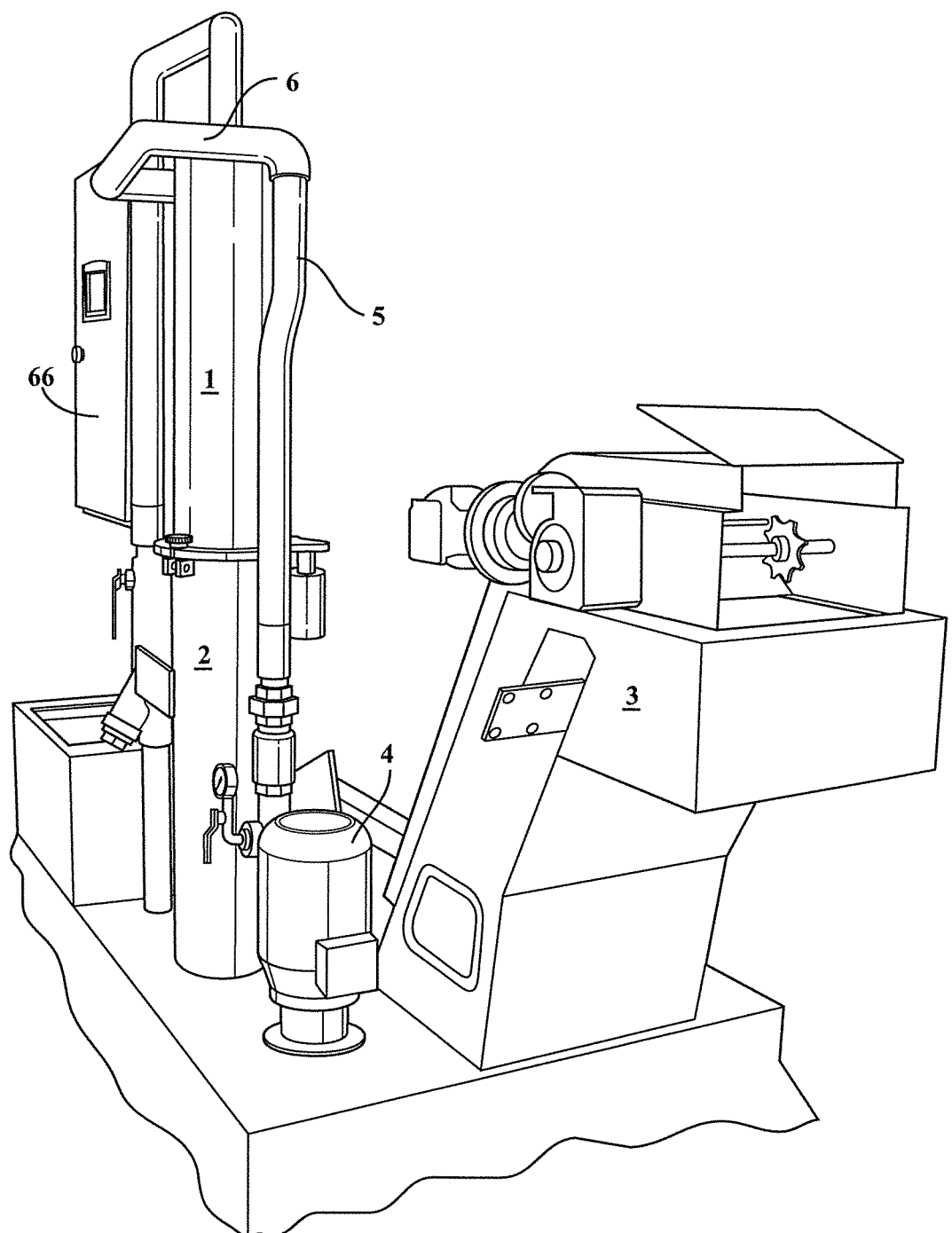
FIG. 2 is a rotated side perspective of the concentrator assembly depicted in FIG. 1 and better showing additional components of an associated machine stage located coolant supply and filtration assembly within which the concentrator assembly is integrated.

Referring initially to FIG. 1, an operational view is shown of the two stage sludge concentrator assembly according to the present invention and which includes first upper centrifugal separator 1 and second lower baffle filter 2 which are provided as a pair of fluidly communicating subassemblies. As previously described, the overall two stage assembly is integrated into a machine stage located coolant supplying or other localized machining operation, this further generally represented by a conveyor portion 3 associated with a part bath or the like.

A pump 4 provides an inlet pressurized flow of (dirty) fluid such as from the localized operation and which is delivery, via an ascending inlet fluid line 5 to an inlet pipe conduit 6 located at an upper end of the first upper centrifugal separator 1. Without limitation, it is understood that the present assembly is capable of being utilized with or integrated into any dirty outlet flow in which separation of a fluidic entrained particulate is desired and which is not limited to the part washing or processing assembly depicted herein for purposes of background illustration.

Figure 4:
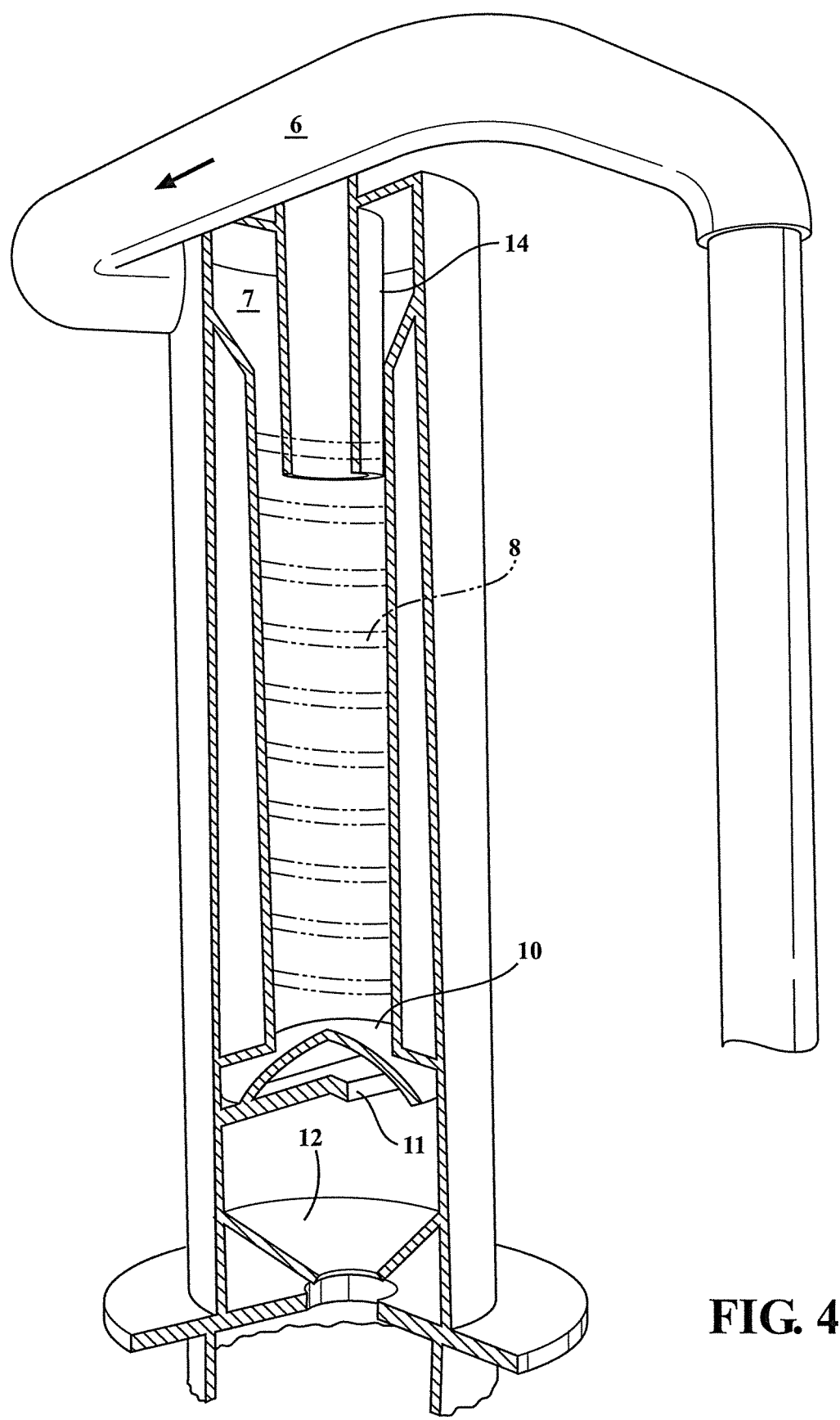
FIG. 4 is an illustration of the upper centrifugal separator subassembly with part of the outer housing removed and better illustrating some of the components associated with its interior constructions, the spiraling centrifugal separator being depicted in phantom.
Figure 5:
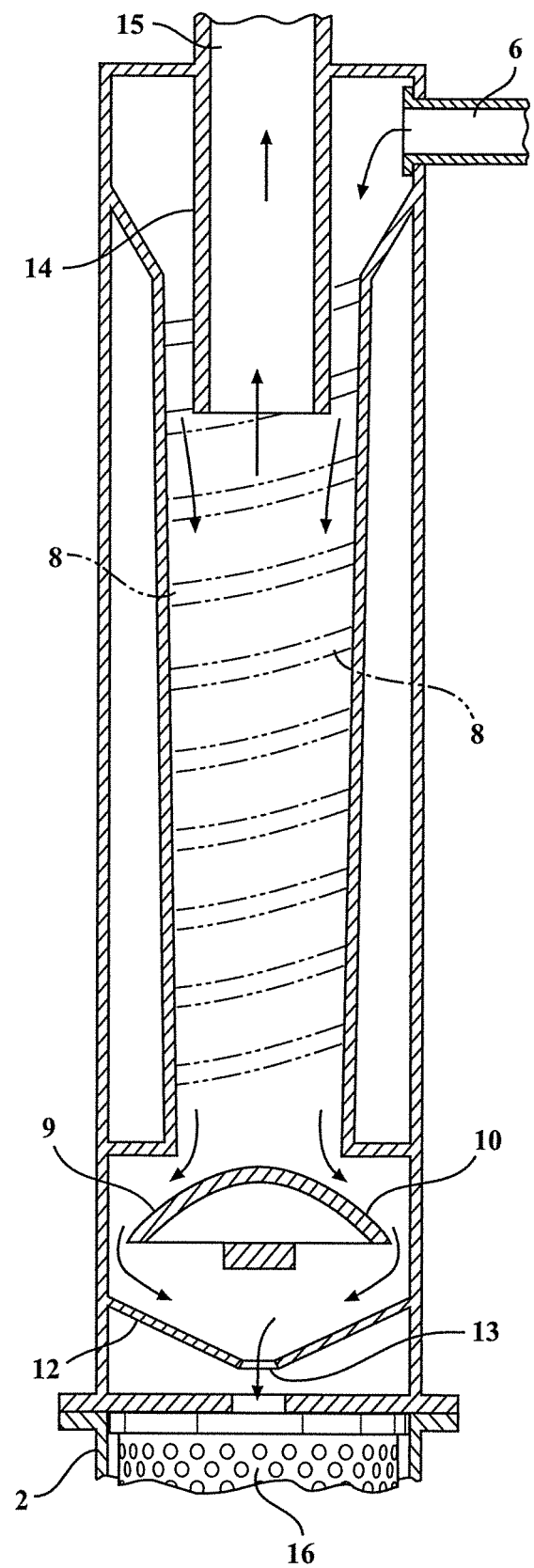
FIG. 5 expands on the illustration of FIG. 4 and depicts a plan schematic of the upper centrifugal separator.
Figure 6:
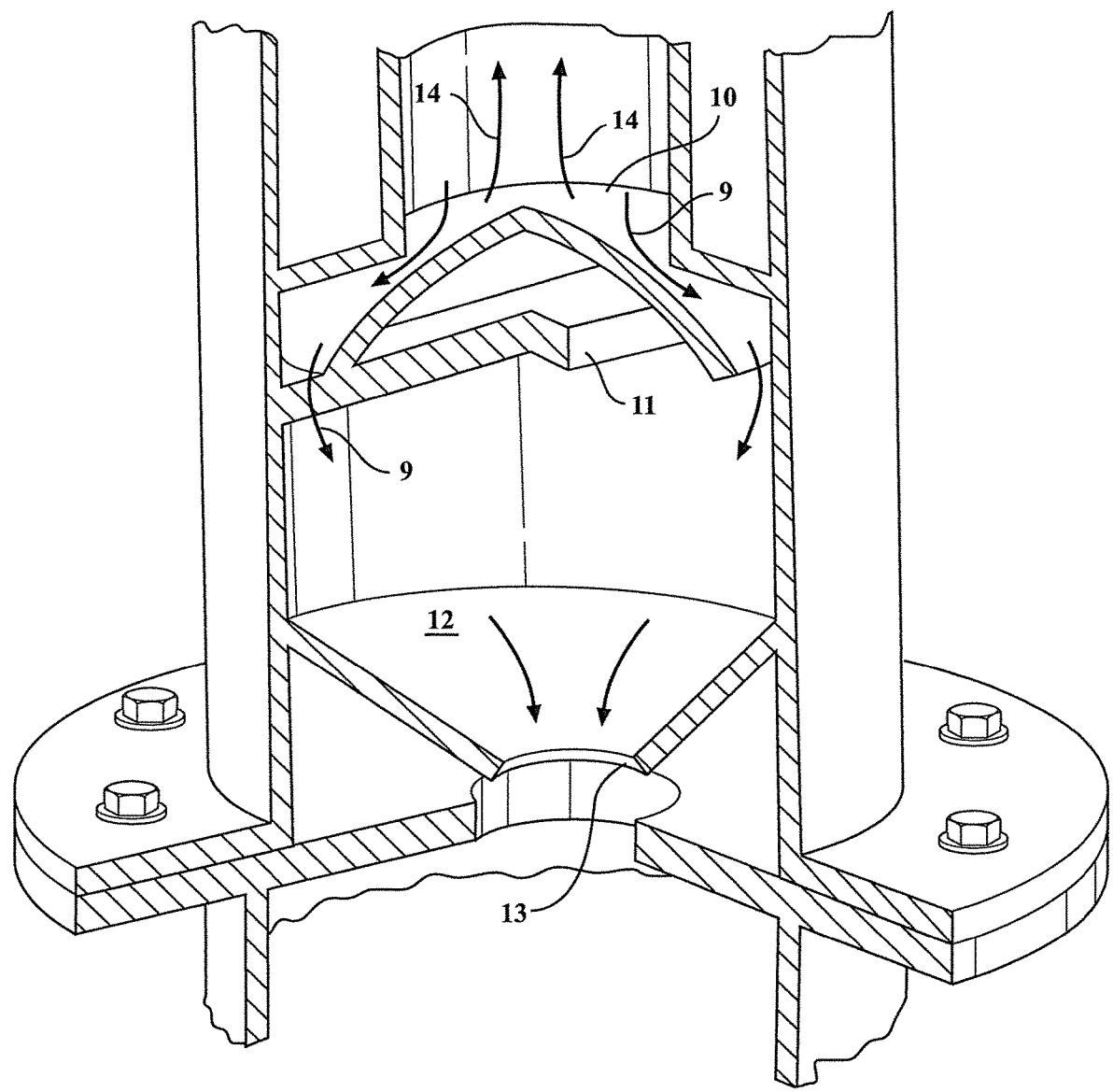
FIG. 6 is a further enlarged perspective of a collection component associated with a lower end of the upper centrifugal separator and for providing simultaneous vertical gravity feed of dirty particulate entrained water remaining from passage through the centrifugal separator, combined with a negative pressure (Venturi effect) up-flow of a volume of clean fluid through a vertically ascending pipe mounted within the open interior of the upper centrifugal separator.

Proceeding to the succeeding illustrations of FIGS. 4-6, additional detail is provided regarding the operation of the upper centrifugal separator 1 and which again illustrates the delivery of the inlet (dirty) flow via pipe 6 located in communication with a generally upper end location of the upper housing associated with centrifugal separator and such that the dirty fluid enters an inlet location 7 of an inner cavity of the housing. For purposes of ease and clarify of illustration, a spiraling centrifugal separator is partially illustrated in phantom 8 in FIG. 4 and further shown in schematic in FIG. 5 and can, by intended design, integrate a parallel or a reducing or narrowing of diameter or cross sectional profile along its descending height (this increasing velocity along the centrifugal separating stage and providing the eventual negative pressure for clean water up-flow as will be subsequently described). Although not shown, it is also understood that the spiral descending and narrowing centrifugal separator can exhibit either a closed or open slide profile in cross section and which, without limitation, hugs the inside cylindrical surface of the upper separator 1.

As shown, the centrifugal separator provides the combined aspects of influencing entrapped particulates and other media for removal from the downwardly spiraling flow and for redirection as a subdivided (and particle entrained) flow 9 (see FIGS. 5 and 6) for delivery to a pseudo/inverted saucer shaped component 10 (this exhibiting in one non-limiting example an inverted convex surface as best shown in FIG. 4) positioned at a bottom receiving end of the centrifugal subassembly interior. As best shown in FIG. 6, the collection component 10 is supported by an underside spaced brace 11 or the like and feeds the dirty/centrifugally separated flow of fluid 9 down over the convex surface of the collection component 10 for subsequent collection and gravity feed in an evenly distributed fashion through a bottom most located funnel 12, an outlet 13 of which corresponding to an inlet of the lower positioned and communicating baffle filter subassembly 2.

It is understood that the interiorly suspended/supported collection component 10 and (optionally) the funnel 12 can be combined into a removable sub-assembly which is capable of being quickly removed and cleaned or exchanged during normal operation, such as in order to allow cleaning of the convex sludge collection chamber. The removability aspect of the collection component 10 and funnel 12 can be facilitated by the reconfiguration depicted in FIG. 4A and by which the lower sludge collector components (collection component 10 and bottom located funnel 12) associated with the upper centrifugal separator are integrated into a separate and slide-out removable module which facilitates easy replacement with a clean module with minimal down time and further ease in subsequent cleaning of the fouled collector.

This is further depicted by an outer spaced apart pair of annular projecting plates, designated at 1A and 1B and associated with an anchored or otherwise vertically supported outer housing of the upper separator 1, between which an inner pair of plates 1C and 1D and a removable cylindrical portion 1E are releasably secured by upper 1F and lower 1G circumferentially arrayed bolt and nut fasteners. In the revised variant of FIG. 4A, the collection component 10 and funnel 12 are integrated into the removable section 1E of the upper separator 1 and, in use, the separator can be momentarily deactivated to allow for quick change-out of the fouled collection components with a clean replacement component. Following quick reattachment of the upper 1F and lower 1G fasteners, the separator can be reactivated and sludge separation quickly resumed. Without limitation, it is understood that a removable section incorporating the collection component and funnel can be redesigned or reconfigured in any number of different fashions from that shown and with the intention to provide for quick change out of a fouled sub-assembly with an identically configured replacement.

Figure 4A:
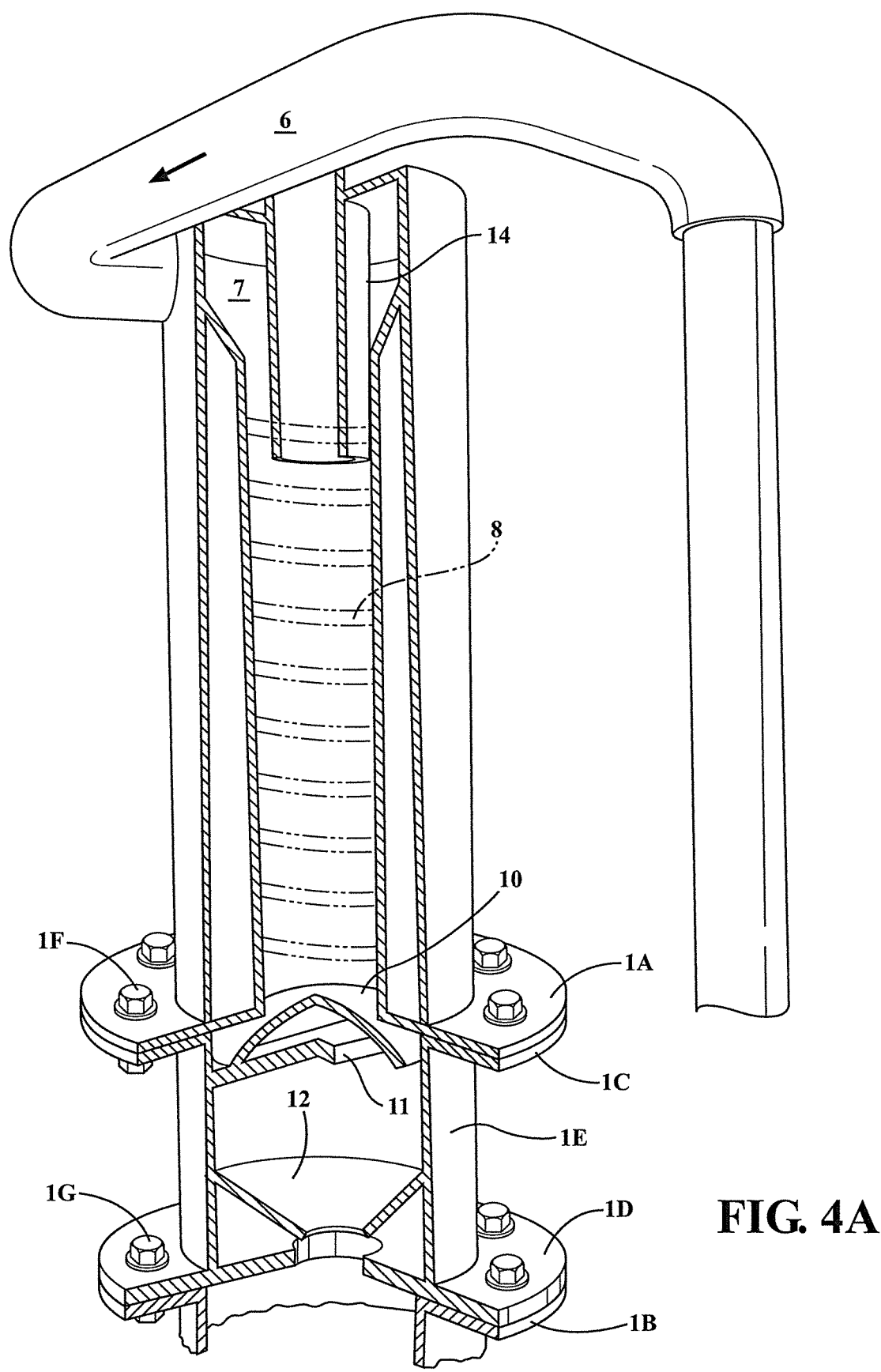
FIG. 4A is a slight modification of the cutaway assembly depicted in FIG. 4 and by which the lower sludge collector components associated with the upper centrifugal separator are integrated into a removable module which facilitates easy replacement with a clean module with minimal down time and further ease in subsequent cleaning of the fouled collector.
Figure 4B:
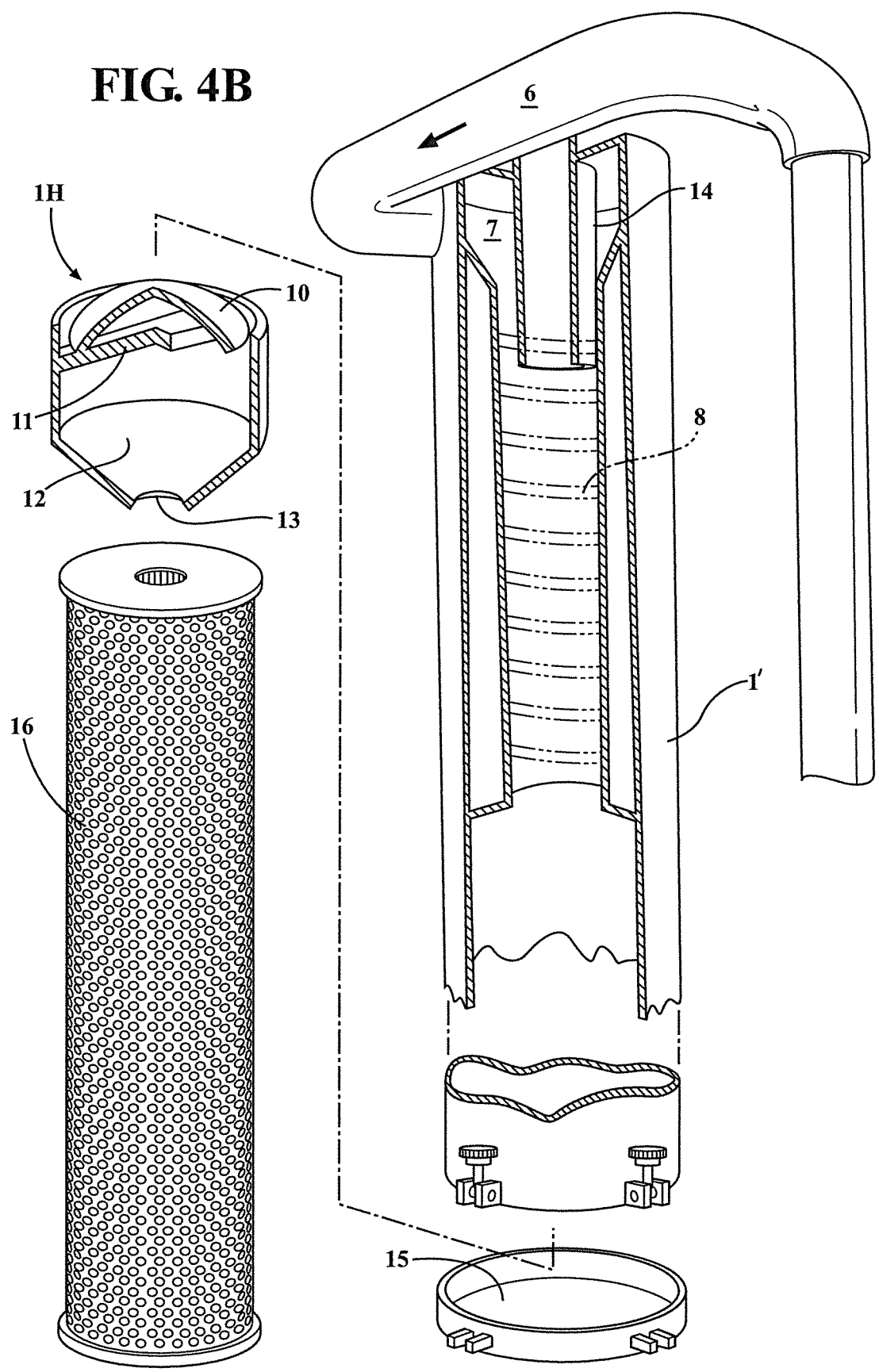
FIG. 4B depicts a further modification of the assembly of FIG. 4 depicting the lower sludge collector components incorporated into a sleeve shaped and cartridge type insertable component which inserts over the top of the baffle style filter and which serves both as a separation apparatus and a filter hold down mechanism.

As further referenced in FIG. 4B, the lower vessel 2 is not shown for purposes of ease of illustration however, and viewing in combination with FIG. 1, the lower vessel terminates in a closed bottom 15 for supporting thereupon the cylindrical shaped baffle style filter 16. FIG. 4B further illustrates the integrating collection components 10, brace 11 and funnel 12 with bottom end discharge 13 which are incorporated into a sleeve shaped and cartridge type insertable component, see as generally depicted at 1H, which inserts over the top of the baffle style filter 16 (see as further described in exploded FIG. 21 with internal sleeve shaped baffle filter) and which serves both as a separation apparatus and a filter hold down mechanism.

In this variant, the flange constructions in FIGS. 4 and 4A are removed and the overall cylindrical housing incorporating the upper stage separator and lower filtration stage can be constructed as a single continuous tube 1' permitting bottom loading of the combination component 1H and the sleeve 16. To this end, a separate bottom seal and cap is provided for closing off the assembly. As will be also described in additional detail in subsequent FIGS. 23A-23B, additional envisioned variants can also include a suitable high pressure backwash protocol built into the upper separator 1 and which provides for quick and iterative cleanout removal of sludge build up resulting from normal use.

During normal operation of the centrifugal separator, a negative pressure zone or vacuum is created within the open interior of the upper separator 1 (this known also as a Venturi effect in which a fluid flow through a restricted area results in simultaneous increase in velocity and decrease in pressure), such that an up-flow of a volume of clean fluid through a vertically ascending pipe 14 (see FIGS. 5 and 6) mounted within the open interior of the upper centrifugal separator. The clean outlet flow can exhibit, without limitation, such as 0.98 specific gravity of the carrier fluid or higher and correspond to approximately 98% removal of the sludge, such as without limitation at 2.8 specific gravity or higher and about 60 micron, and/or the like and prior to be discharged through outlet clean line 15 (FIG. 1) for subsequent rerouting to either a sump or other remote location for further cleaning/reprocessing and such as prior to be reintroduced into a suitable feed coolant reservoir.

Figure 7:
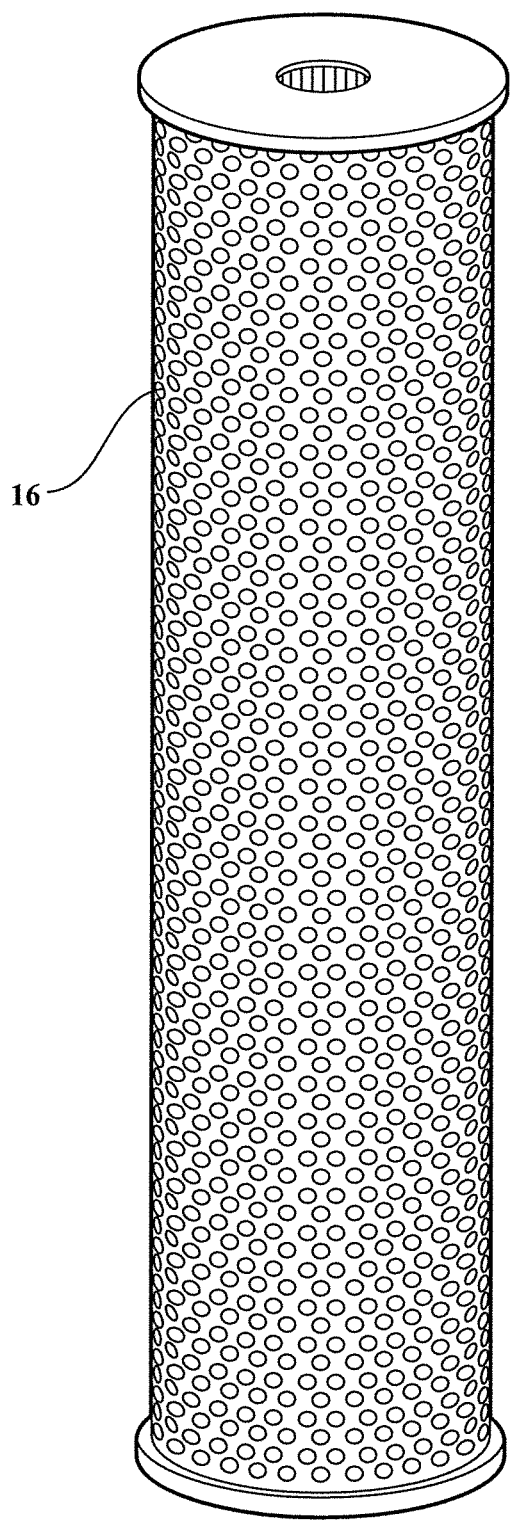
FIG. 7 is an illustration of a cylindrical filter element associated with the lower baffle filter subassembly.

FIG. 7 is an illustration of a cylindrical filter element 16 associated with the lower baffle filter subassembly 2 and which operates to entrap the particulates separate from the gravity fed and downwardly flowing stream 9 delivered by the centrifugal separator. As shown, the baffle filter 16 can exhibit an outer perforated screen which houses any type of capturing media, such as rated for entrapping in any range including but not limited to 0.35 to 30 micron or larger sized particulates, and which permits a centrally interior delivered dirty flow 9 from inlet 13 (again FIG. 6) to flow radially outwardly such that the particulates are entrapped within the filter media.

Figure 3:
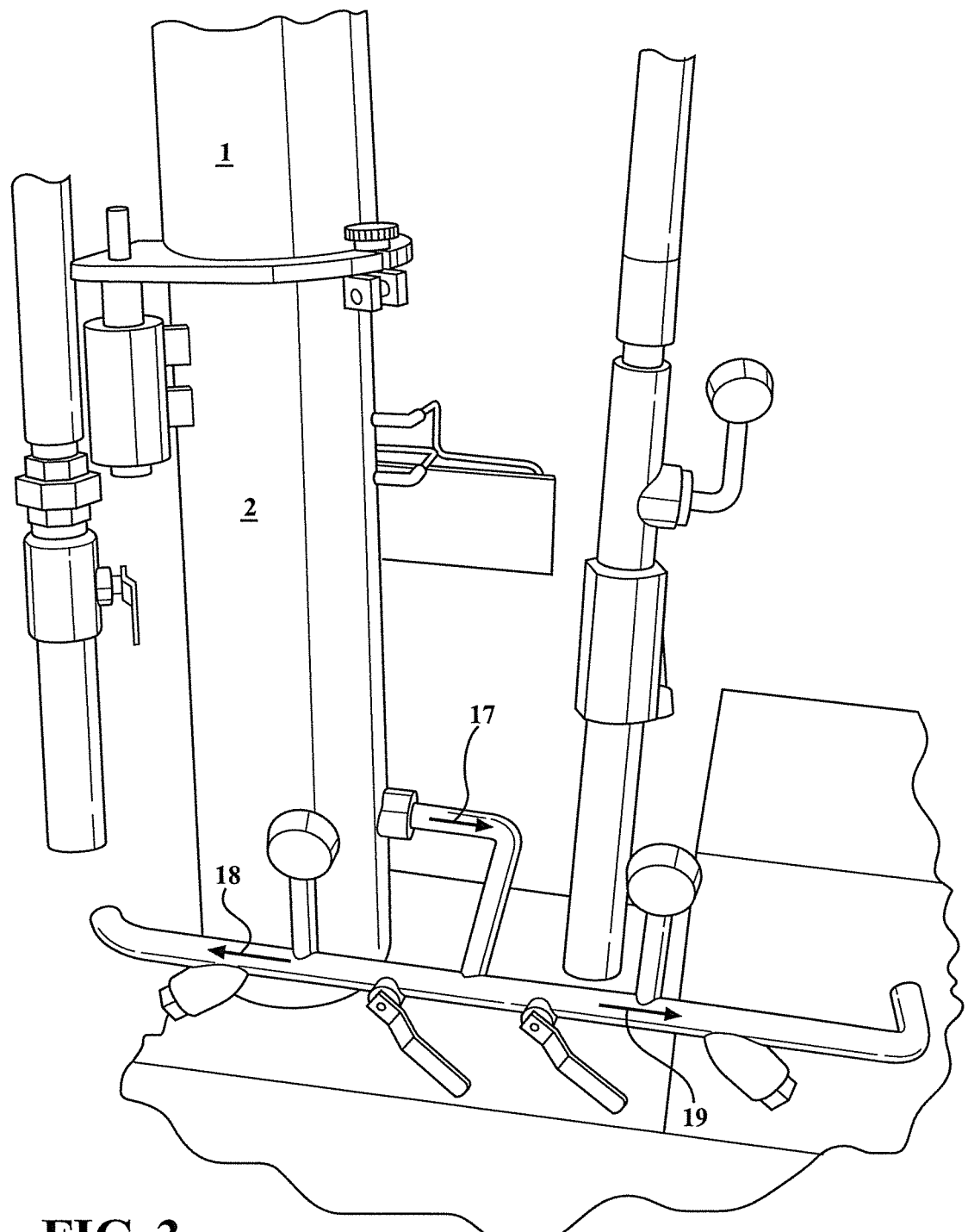
FIG. 3 is a reverse side view of the concentrator assembly shown in FIG. 1 and illustrating in larger sectional fashion a lower (clean) outlet associated with the barrier filter subassembly and which can be piped for dual applications.

The remaining clean fluid flows from the open interior of the filter 16, through the baffles and out the exterior and cylindrical configured/apertured screen, following which the now substantially clean flow descends along an annular extending exterior of the filter 16 and the surrounding inner wall of the lower subassembly 2 to an outlet depicted in FIG. 3 as conduit line 17 extending from lower filter subassembly 2 and subsequently branching to opposite extending outlets 18 and 19, each of which can further represent sump or resupply lines (such as further to facilitate ongoing fluid flow in a separate processing application). The flow properties associated with this port function are designed in part to maintain balance in the upper stage flow and, in one non-limiting instance, can be regulated down to approximately 10% of the upper input flow rate with the use of any suitable valving or flow regulating components integrated into the assembly.

Figure 8:
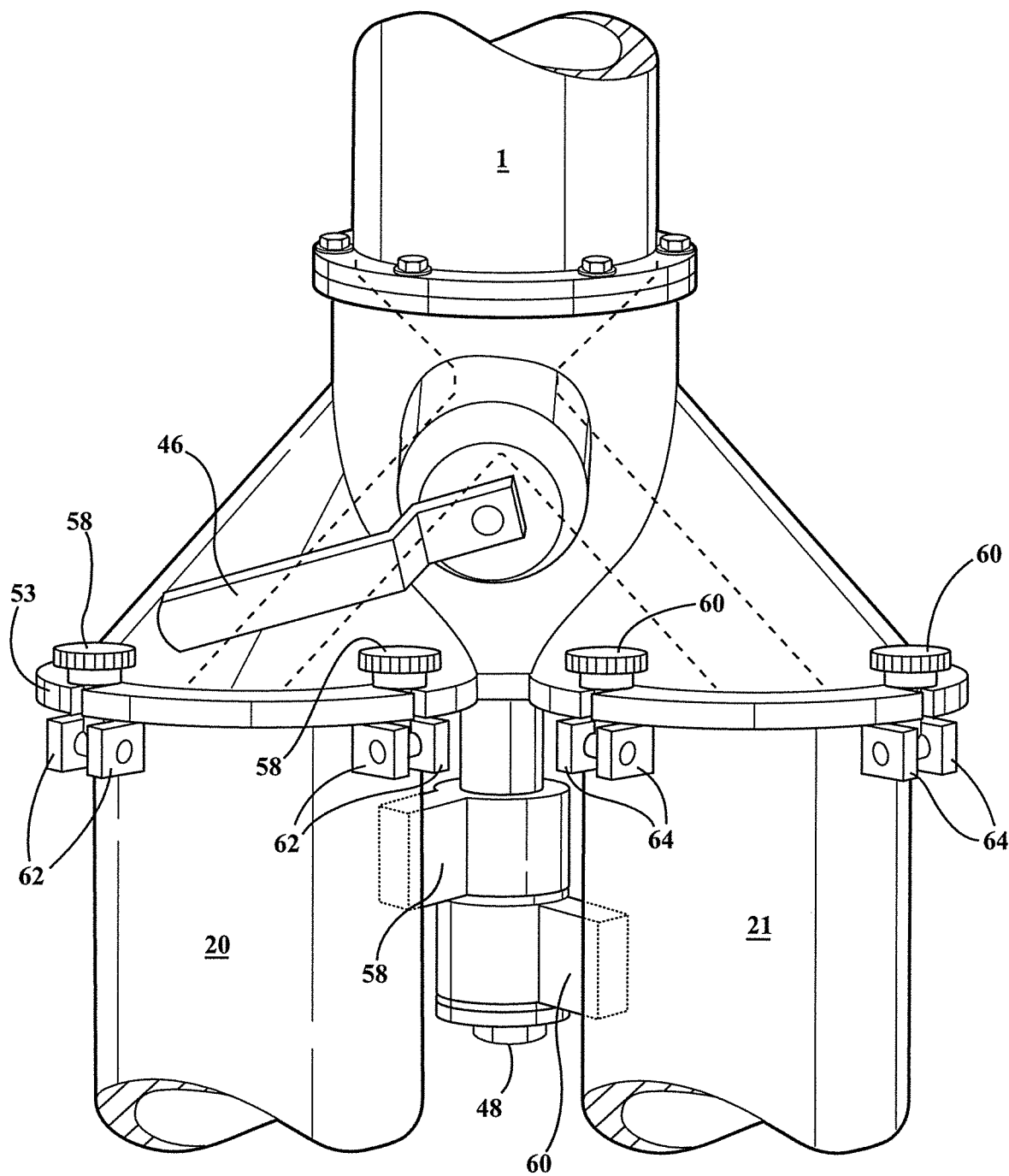
FIG. 8 is a schematic illustration of an alternate variant of a two stage sludge concentrator assembly and which integrates a dual baffle filter arrangement in selective communication with an upper stage centrifugal separator and in which a lever is employed for selectively delivering a waste fluid stream from the upper separator subassembly to a selected/engaged lower baffle filter subassembly, such permitting the inactive baffle filter subassembly to be rotated outwardly from a first fluidic communicating position to an open position for permitting servicing and/or removal/replacement of a used baffle filter.
Figure 8A:
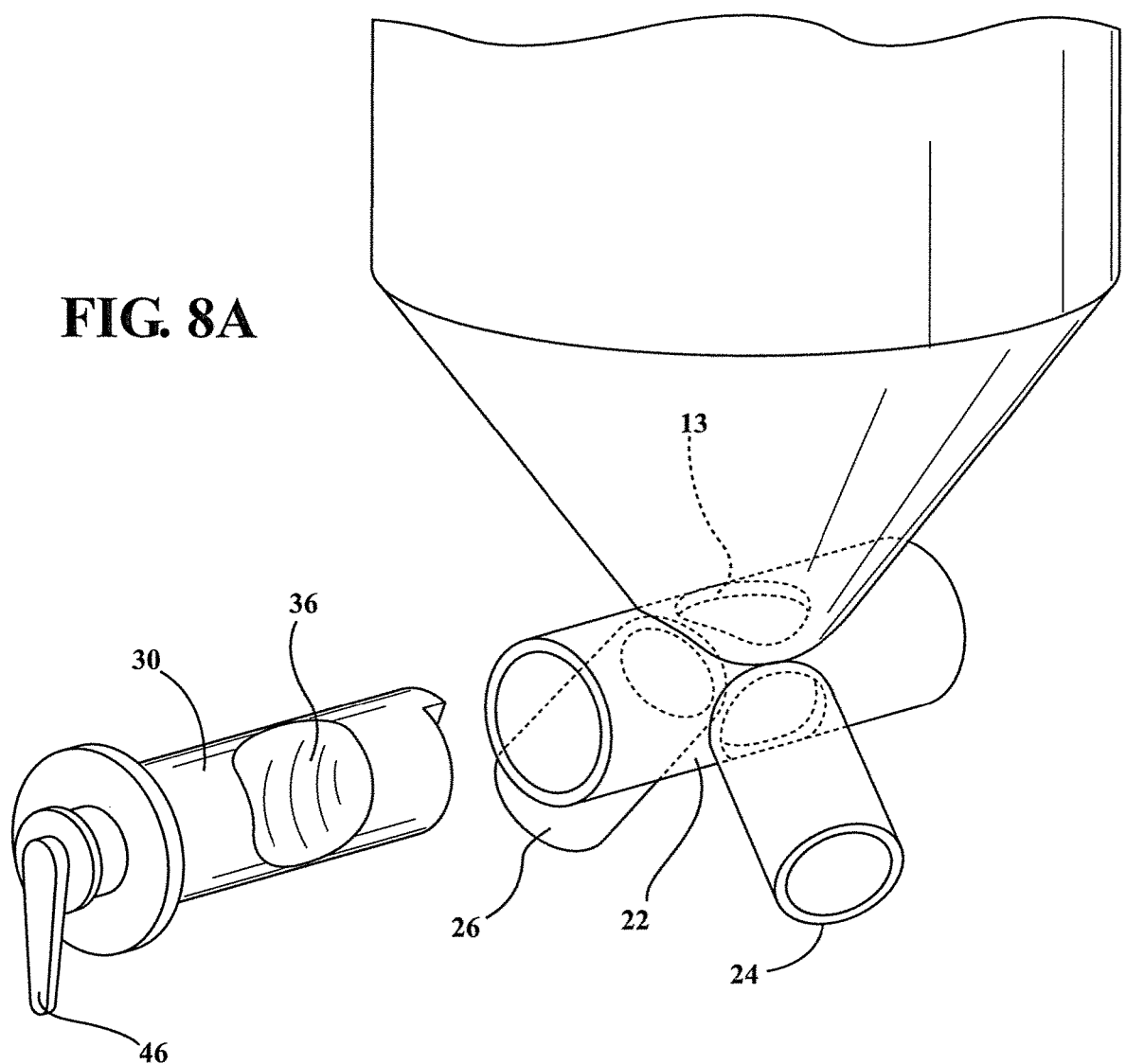
FIG. 8A is an enlarged and partially exploded sectional perspective of a confluence conduit location established below the sludge separating cone and into which is installed a rotatable sleeve supported valve for directing flow between first and second baffle communicating outlet locations.
Figure 8B:
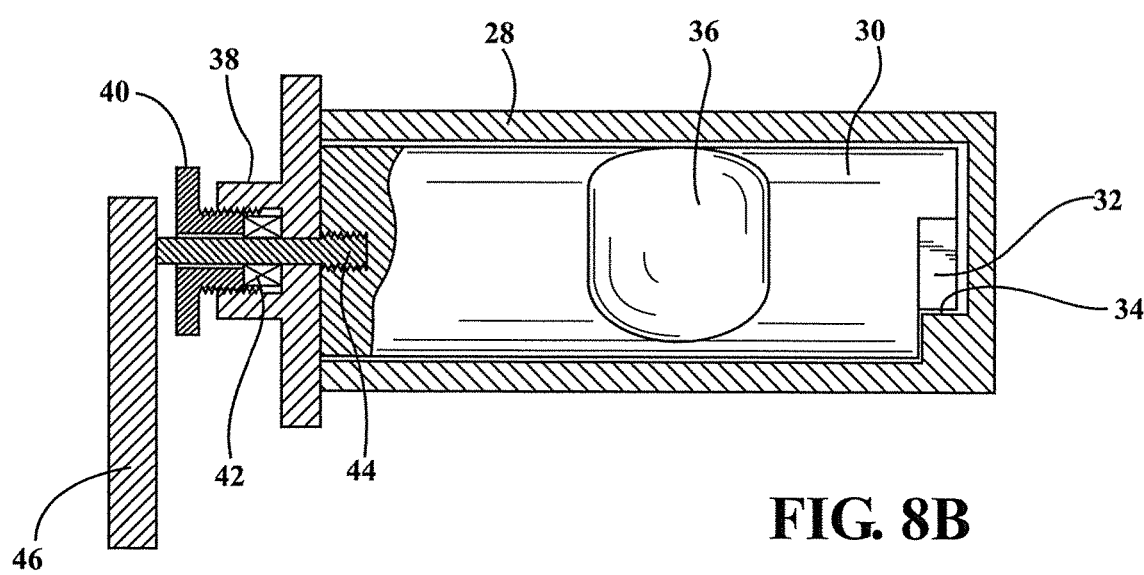
FIG. 8B is a linear cutaway of the sleeve supported valve in FIG. 8A.

FIG. 8 illustrates a schematic illustration of an alternate variant of a two stage sludge concentrator assembly and which integrates dual baffle filters represented by lower subassembly housings 20 and 21 (each of which receiving a filter 16), these arranged in selective communication with an upper stage centrifugal separator, such as previously described at 1). As further depicted in succeeding exploded perspective and cutaway views of FIGS. 8A and 8B, a confluence location is established underneath the outlet 13 of the bottom located funnel 12 associated with the centrifugal separator 1, this including a sleeve 22 which intercepts the outlet 13 and to which in turn are communicated with a pair of angled and flow receiving outlets 24 and 26 feeding respective inlet locations of each lower subassembly housing 20 and 21.

A cylindrical valve assembly includes such as an outer machined steel sleeve 28 exhibiting an open interior and within which is seated a rotatable and inter-actuating UHMW (ultra high molecular weight polyethylene) valve core 30 as well as any other material such as brass, stainless steel or the like. A first seating location 32 is configured in an circumferential facing direction to an inserted end location of the cylindrical shaped core 30 and which is opposed by an additional seating location 34 configured in communication with the interior of the sleeve 28 for abutting the first seating location 32 of the core at a defined rotational position.

The features represented at 32 and 34 are generally understood to correspond to a single or pair of respective opposing and abutment locations established between the core 30 and the outer sleeve 28 and, in use, restrain the core to a limited rotational range for facilitating flow redirection between either of the outlets 24 and 26. This is further assisted by a fluid communicating pathway defined by concave feature or recess, at 36, define in the rotatable core 30 and which, depending upon the rotational position of the core 30 relative to the outer sleeve 28, fluidly communicates the upper outlet 13 of the centrifugal separator 1 with either of the angled outlets 24 and 26 leading to the lower baffle assemblies 20 and 21.

Additional features include a valve gland 38 with compression nut 40 and gland packing 42. A stainless steel valve stem 44 is also depicted at extending through an end wall aperture of the outer sleeve 28 and, in combination with an exteriorly located handle 46, rotates the core 30 between a first position in which the feature 36 communicates dirty flow from upper outlet 13 to a first selected outlet 24 to a second position in which upper outlet 13 is communicated with second selected outlet 26.

In this manner, the valve assembly is employed for selectively delivering the waste fluid stream 9 from the upper separator subassembly 1 to a selected/engaged lower baffle filter subassembly 20 or 21, such permitting the inactive baffle filter subassembly to be rotated outwardly from a first fluidic communicating position to an open position for permitting servicing and/or removal/replacement of a used baffle filter. It is also envisioned that the valve configuration of FIGS. 8A and 8B can be redesigned or substituted with any suitably constructed valve subassembly, such as which incorporates a core exhibiting any other suitable flow permitting architecture, such as which can further substitute the concave recess 36 for any other interior extending network or pattern defined in the core 30, and which facilitates fluid flow from the upper outlet 13 and between one of the lower angled flow outlets 24 and 26 to the respective baffle filter subassemblies.

Figure 9A:
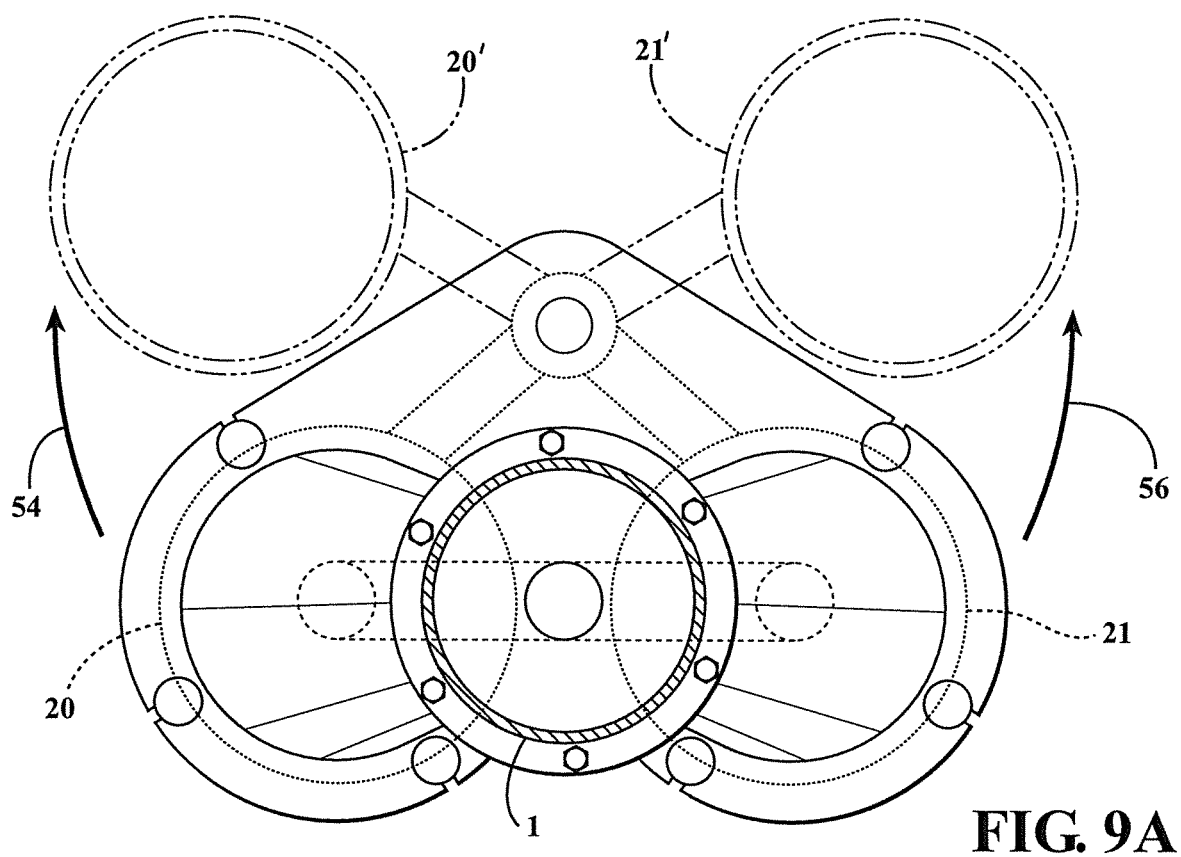
FIGS. 9A and 9B depict top and partial side views of the dual variant of FIG. 8 and which better illustrates one non-limiting drop and rotate configuration for converting either baffle filter subassembly from fluidly connected/engaged to fluidly disconnected/opened positions.
Figure 9B:
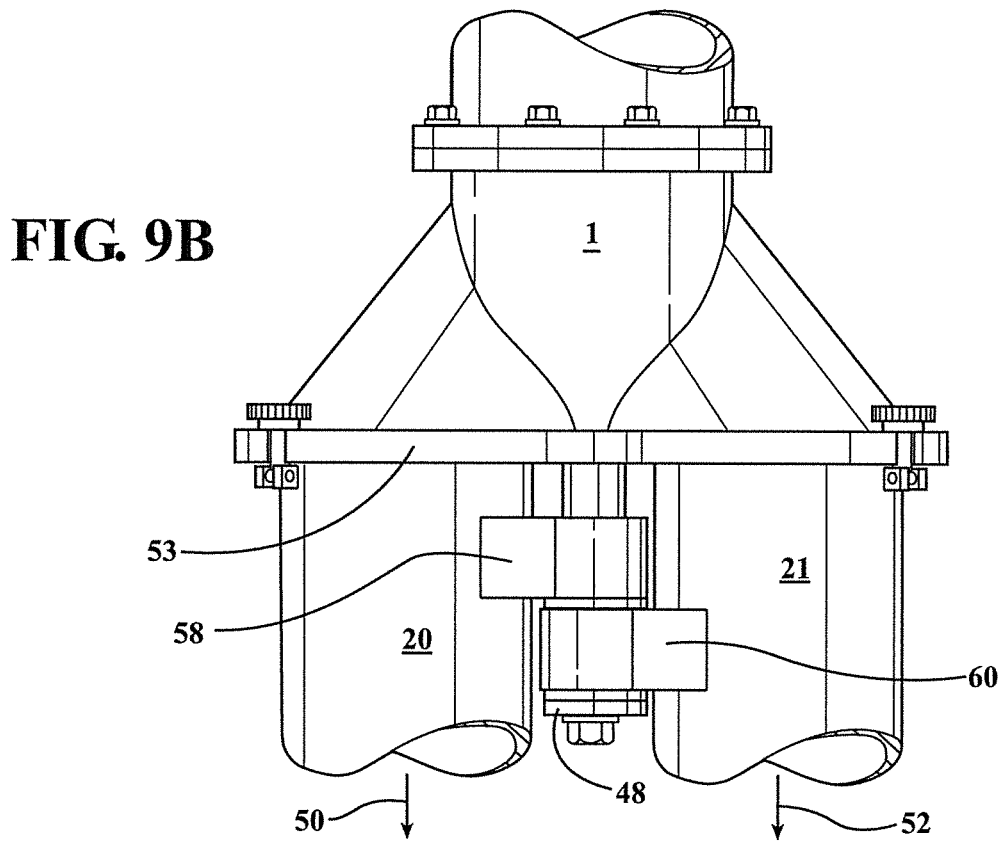

Referring finally to FIGS. 9A and 9B, respective top and partial side views are presented of the dual baffle filter variant of FIG. 8 and which better illustrates one non-limiting construction in which a selective drop and rotate configuration converts either baffle filter subassembly 20 or 21 from fluidly connected/engaged to fluidly disconnected/opened positions. As shown, this can include a support post or stem 48 (also termed common post) to which each of the baffle filter housings 20 and 21 are secured in a suitable coupling arrangement which is lever actuated via known structural connections for permitting either filter housing 21 or 22.

The present invention contemplates any of a number of different protocols for disassembling a given filter housing 21 and 22 and which can include, in one non-limiting version, either housing initially descending from an underside seating location associated with either angled outlet 24 and 26 a limited distance (see further directional arrows 50 and 52 in FIG. 9B) in order to become disconnected from a lowermost extending plate 53 within which is communicated the bottom most extending locations of the outlets 24 and 26 alternately in communication with the upper centrifugal separator 1.

Following initial vertical descent of the housing 21 or 22, it can be subsequently outwardly rotated about the common post 48 along either of additional directional arrows 54 or 56 (see as shown in phantom in FIG. 9A corresponding to open housing positions 20' and 21') thereby revealing the open interior and permitting fast cleaning or exchange of a clogged filter for a replacement).

Also shown at 58 and 60 in FIGS. 8 and 9B are the central post connector couplings 58 and 60 arranged in one non-limiting and stacked fashion around the central post 48 and in turn structurally supporting the individual lower baffle housings 20 and 21. In order to facilitate alternate removal of either of housing 20 and 21, this again in order to access its interior and to allow removal and replacement of the baffle filter 16, it is understood that the dimensions of the supporting central post 48, as well as the spacing between the connector couplings 58 and 60, can be modified.

This can include, in one particular instance, in designing the upper coupling 58 associated with filter assembly 20 for removal and replacement to be spaced differently than is shown in order that it be permitted to initially descend a given distance without contacting the lower coupling 60 and then subsequently swung open. It is also envisioned that, upon opening a selected housing 20 or 21 by first unscrewing/removing sealing fasteners (see pairs at 58 and 60) which clamp to pairs of tabs (further shown at 62 and 64 at upper end locations of the housings 20 and 21), a selected housing 20 or 21 is unsealed from the configured plate 53. At this point, and without limitation, the mechanical articulation of the housing 20 or 21 can be permitted to either initially descend (arrows 50 and 52) or initially swing outwardly (arrows 54 and 56) to facilitate quick change out and replacement of a selected filter subassembly while retaining flow operation through the other filtration subassembly.

Other features include a suitable control panel 66 (FIG. 1) and which can include a suitable processor control for setting the various operational parameters of the inflow pump 4 and associated outflow conduit lines.

Figure 10:
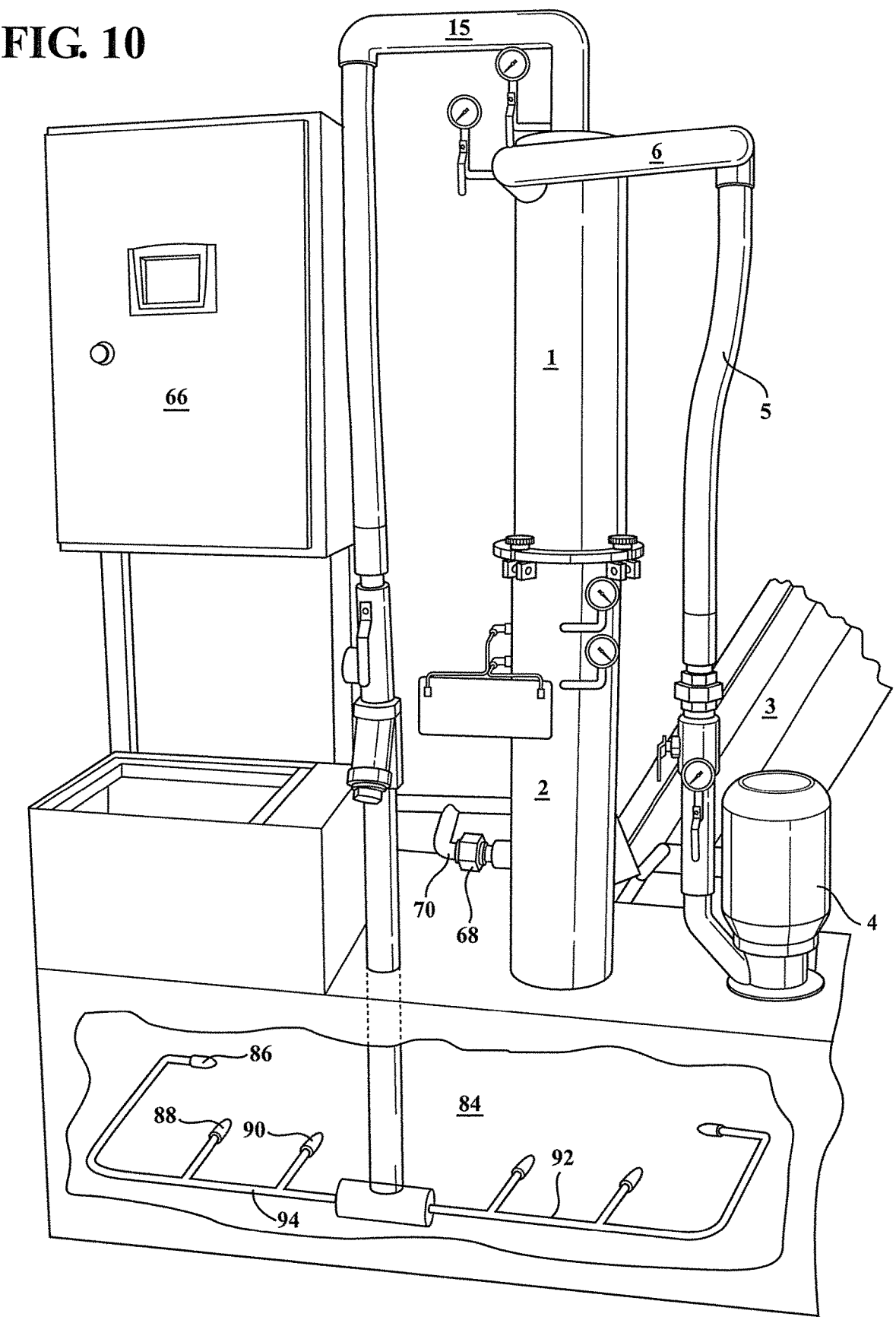
FIG. 10 is an operational view of the two stage sludge concentrator assembly according to a further embodiment of the present invention incorporating a clean outlet flow restrictor associated with the second stage baffle filter subassembly.

Referring now to FIG. 10, an operational view is shown of the two stage sludge concentrator assembly according to a further embodiment of the present invention incorporating a clean outlet flow restrictor, see as depicted at 68 which is incorporated into a clean second (lower) stage outlet 70 associated with the second stage baffle filter subassembly (see again vessel 2). As will be explained in additional detail, the flow restrictor operates to control flux rate (defined as a fluid flow in gallons per minute or GPM) per square foot of filter media (as will be further described in FIG. 21).

For purposes of the present description, maintaining the desired flux rate within the second baffle filter vessel 2 (this also correlating to the associated fluid velocity or amount of energy exerted on the aggregating debris, such as metal shavings and the like which generated during any metal processing operation) is desirable as, in the absence of such flow restriction, initial buildup of debris within the baffle filter will result in the premature clogging of the same resulting from excessive flux rate in the second vessel 2. This is further best illustrated in the partial plan cutaway views of FIGS. 19-20 of a collection interface established between accumulating debris particles 72, 74, 76, et seq., and the media surface 78 of the second stage baffle filter for delivery through a plurality of apertures (see closed rim surfaces 80) associated with the cylindrical shaped outer sleeve of FIG. 21 for receiving a similarly sleeve configured baffle filter 80 having a vertically descending open material and a cross sectional pleated profile.

By illustrative example and without limitation, the two stage filtration assembly contemplates a majority (in some instances in excess of 90%) of the dirty inlet fluid 6 delivered to the upper (e.g. centrifugal separator) stage being exhausted as clean outlet fluid (again via pipe 15) through the top of the upper chamber or vessel 1. As further shown in FIG. 10, a cutaway of one non-limiting example of a base fluid reservoir 84 is shown and by which the first stage clean fluid flow (attention again being given to the description of the initial embodiment of FIGS. 1-9B) can be resupplied to the base reservoir via inlet nozzles 86, 88, 90, et seq., associated with a piping network, see further at 92 and 94, tied into a lower location of the clean first stage outlet pipe 15.

As is further understood, the second stage dirty fluid flow, such as delivered through the collection element interconnecting the upper 1 and lower 2 vessels (see again FIGS. 4-4B), is typically very heavily laden with particulate debris and can constitute as little as 10% of the fluid flow as compared to that exiting through clean outlet pipe 15 associated with the first/upper stage vessel 1. As further shown in FIG. 19, controlling the flux rate within the second baffle filter vessel 2, via the second stage flow restrictor (such as within a desired range or profile calculated from the anticipated pressure of the fluid in/fluid out profile existing within the first upper stage centrifugal separator vessel 1), results in the minimizing the amount of force exerted by the fluid on the debris 72, 74, 76 et seq., and, in the example of FIG. 19, permitting the flow of the remaining fluid volumes, see arrows, 92, 94, 96, et seq., radially outwardly through the filter media 78 and the outer vessel apertures 80.

FIG. 20 is a further illustration taken from FIG. 19 and illustrating the result of an excessive flux rate condition resulting in higher force/impact of debris (see now at 72', 74', 76', et seq.) against the filter media 78, thereby resulting in clogging of the filter and resulting in the need for replacement of the filter before the same is fully filled with captured debris. As will be further described, one desired advantage of integrating flow restriction into the lower vessel/second stage outlet is to prevent excessive flux rate of the fluid, with attendant compressing forces exerted upon the accumulating debris captured within the vertically extending central interior of the baffle filter, from prematurely clogging the filter thereby requiring replacement. Rather, an advantage of the flow restriction functionality built into the second stage is to allow the baffle filter to more progressively and fully fill with debris, while maintaining an acceptable outflow profile through the second stage and, following completed filling of the baffle filter interior, to only replace the baffle filter at that point in time.

As also shown in each of FIGS. 1 and 10, an additional flanged relationship, see at 98, is established between a stacking and engaging location of the lower end of the upper vessel 1 with an upper end of the lower vessel 2. As further shown, the upper end of the lower vessel 2 can include abutting brackets (see pairs 100 and 102) which receive threaded shafts or the like associated with tightening knobs 104 and 106 for mounting the first and second stage vessels together (such as in vertically tiered fashion).

The manner and structure for mounting together the vessels 1 and 2 is subject to change within the ordinary skill of the art and, as further understood, the convex collection subassembly (FIGS. 4-4B) can likewise be integrated into the anchoring structure between the upper 1 and lower 2 vessels, it also being understood that other mounting and housing configurations are possible for providing either of a fixed or slide-out collection subassembly. It is also understood that the two stage filter assembly is not limited to a vertically tiered arrangement of first 1 and second vessels 2, as depicted, and may include other configurations including a side-by-side or other conduit interconnecting arrangement, such further contemplating any suitable combination of pumps or other fluid transfer mechanisms for effecting the necessary filtering flow of the fluid in the manner described herein.

Figure 11:
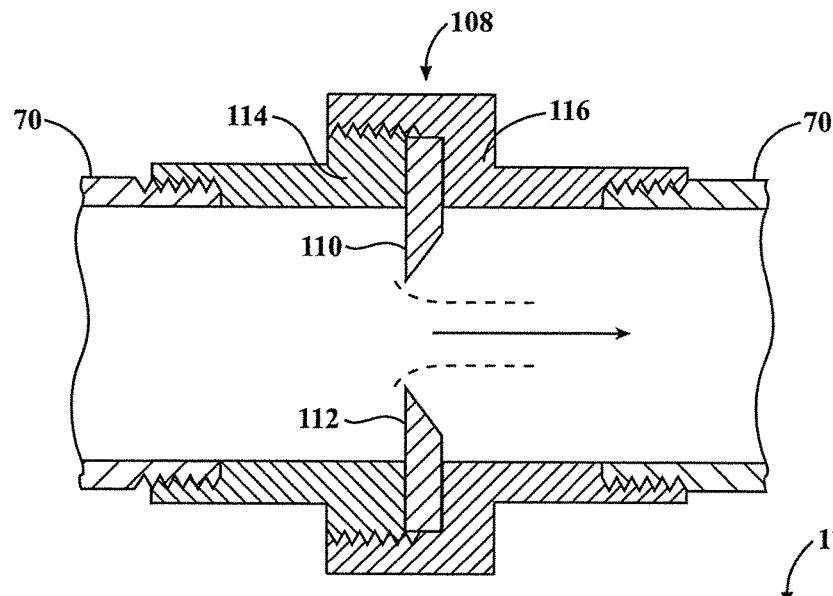
FIG. 11 is a sectional cutaway of a first sub-variant of a known configuration of fixed flow restricting orifice and exhibiting a sharp edged configuration for establishing a selected discharge coefficient and which is incorporated into the second stage clean fluid outlet of the present invention.

Proceeding to FIG. 11 a sectional cutaway is shown at 108 of a first sub-variant of fixed flow restricting orifice (also at 68 in FIG. 10) and exhibiting a sharp edged configuration, see inwardly projecting flow altering obstructions as shown in cutaway at 110 and 112 extending from outer wall edges of a fitting including first 114 and second 116 inter-threaded portions which are integrated into the clean outlet 70 (again FIG. 10) for establishing a selected discharge coefficient. As understood to apply to each of the subsequent fixed orifice configurations of FIGS. 12-16, the sharp edged inner projecting obstructions 110/112 depicted in cutaway can in fact constitute a single disk shaped sharp edge profile.

By calculation, a discharge coefficient (generally approximating a percentage less than 1.0 or 100%) associated with the sharp edged fixed orifice of FIG. 11 is determined to be C=0.61 (61%) of the related flow (GPM) through the outlet 70.

Figure 12:
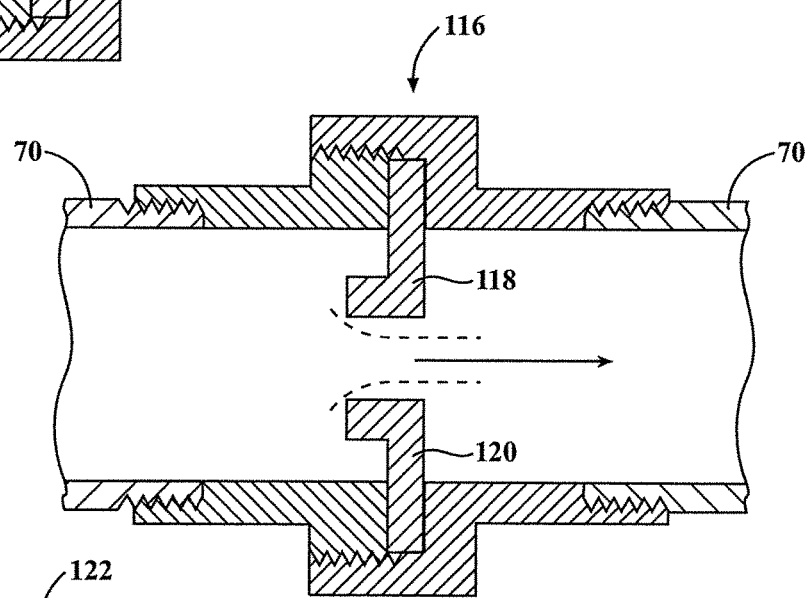
FIG. 12 is a sectional cutaway of a second sub-variant of fixed flow restricting orifice and exhibiting a re-entrant tube configuration for establishing a further selected discharge coefficient.
Figure 13:
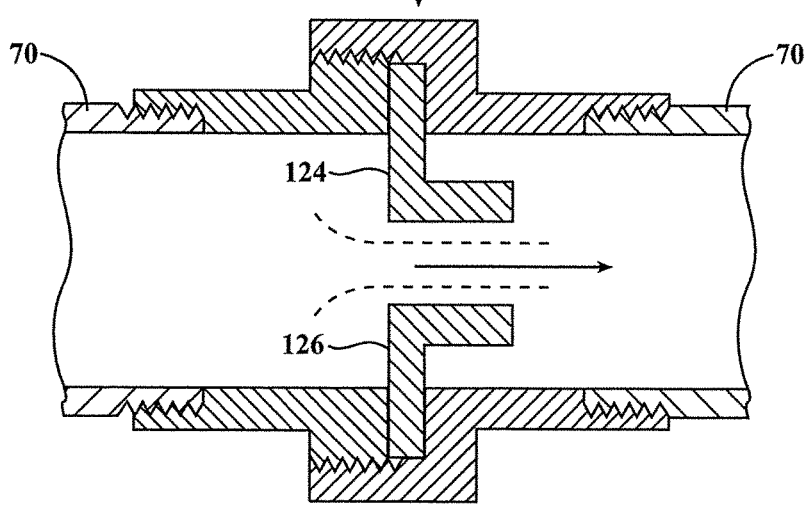
FIG. 13 is a sectional cutaway of a third sub-variant of fixed flow restricting orifice and exhibiting a square edged configuration for establishing a further selected discharge coefficient.

FIG. 12 is a sectional cutaway of a second sub-variant 116 of fixed flow restricting orifice and exhibiting a re-entrant tube configuration, see angled obstruction(s) 118 and 120 in cutaway, for establishing a further selected discharge coefficient (0.52 or 52% of normal flow unimpeded in GPM). FIG. 13 is a sectional cutaway of a third sub-variant 122 of fixed flow restricting orifice and exhibiting a square edged configuration, see obstruction(s) 124/126 for establishing a further selected discharge coefficient (0.61).

Figure 14:
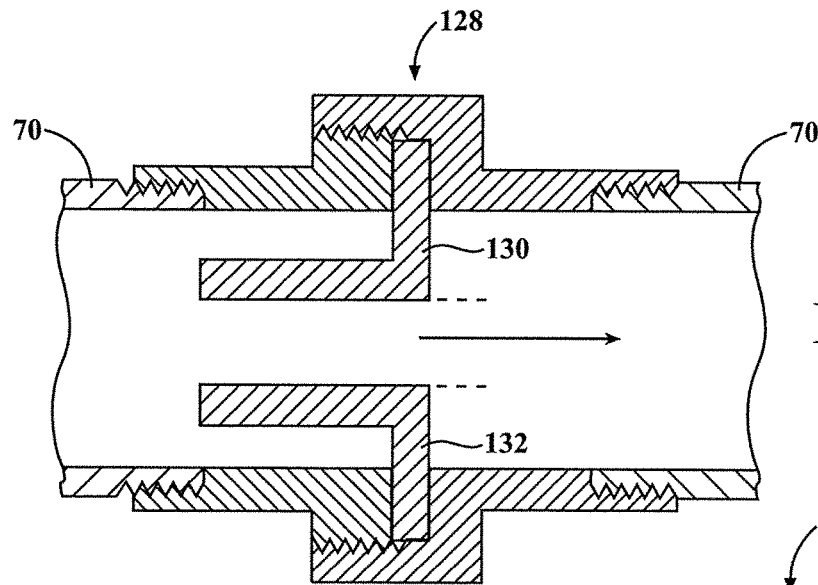
FIG. 14 is a sectional cutaway of a fourth sub-variant of fixed flow restricting orifice and exhibiting a further variation of the re-entrant tube configuration also shown in FIG. 12 for establishing a further selected discharge coefficient.
Figure 15:
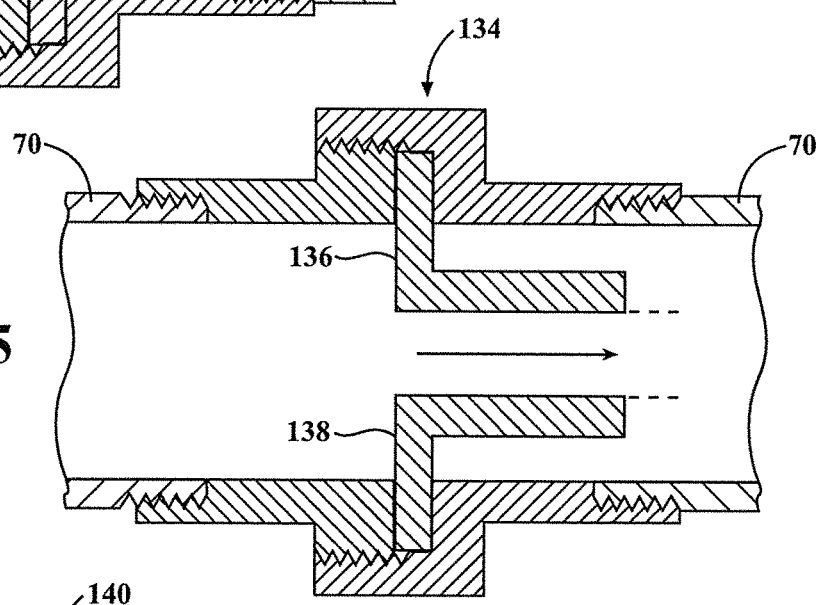
FIG. 15 is a sectional cutaway of a fifth sub-variant of fixed flow restricting orifice and exhibiting a further variation of the square edged configuration also shown in FIG. 13 for establishing a further selected discharge coefficient.

FIG. 14 is a sectional cutaway of a fourth sub-variant 128 of fixed flow restricting orifice and exhibiting a further variation of the re-entrant tube configuration, see further modified obstruction(s) 130/132, also shown in variation in FIG. 12 for establishing a further selected discharge coefficient (0.73). FIG. 15 is a sectional cutaway of a fifth sub-variant 134 of fixed flow restricting orifice and exhibiting a further variation of the square edged configuration, shown by obstruction(s) 136/138 also shown in variation in FIG. 13, for establishing a further selected discharge coefficient (0.82).

Figure 16:
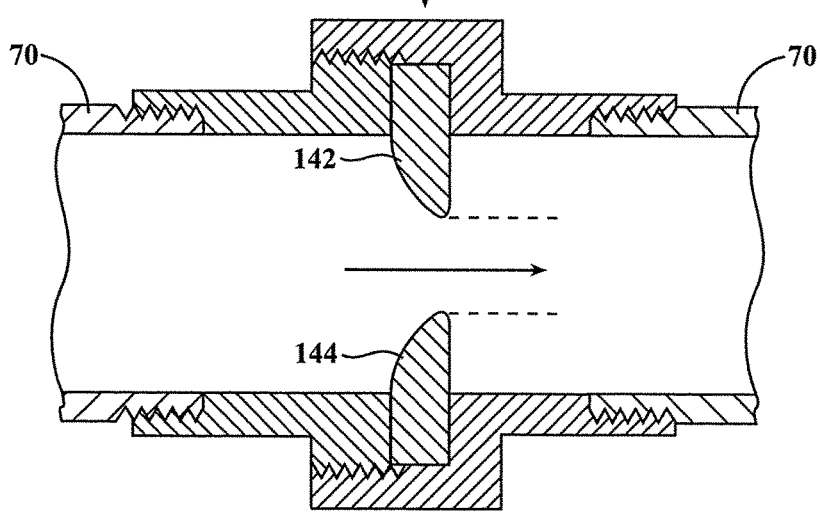
FIG. 16 is a sectional cutaway of a sixth sub-variant of fixed flow restricting orifice and exhibiting a well-rounded configuration for establishing a further selected discharge coefficient.

Finally, FIG. 16 is a sectional cutaway of a sixth sub-variant 140 of fixed flow restricting orifice and exhibiting a well-rounded configuration, depicted by obstruction(s) 142/144 for establishing a further selected discharge coefficient (0.98) which most closely approaches normal flow. Without limitation, the afore-described versions of known fixed flow restrictor profiles (and which are not considered to be Prior Art given their novel integration into a second stage fluid filtering outlet as shown and described herein) can be substituted by other configurations and profiles for tuning or modifying a discharge coefficient of the fluid (water) relative to an unimpeded or normal fluid flow.

Figure 17:
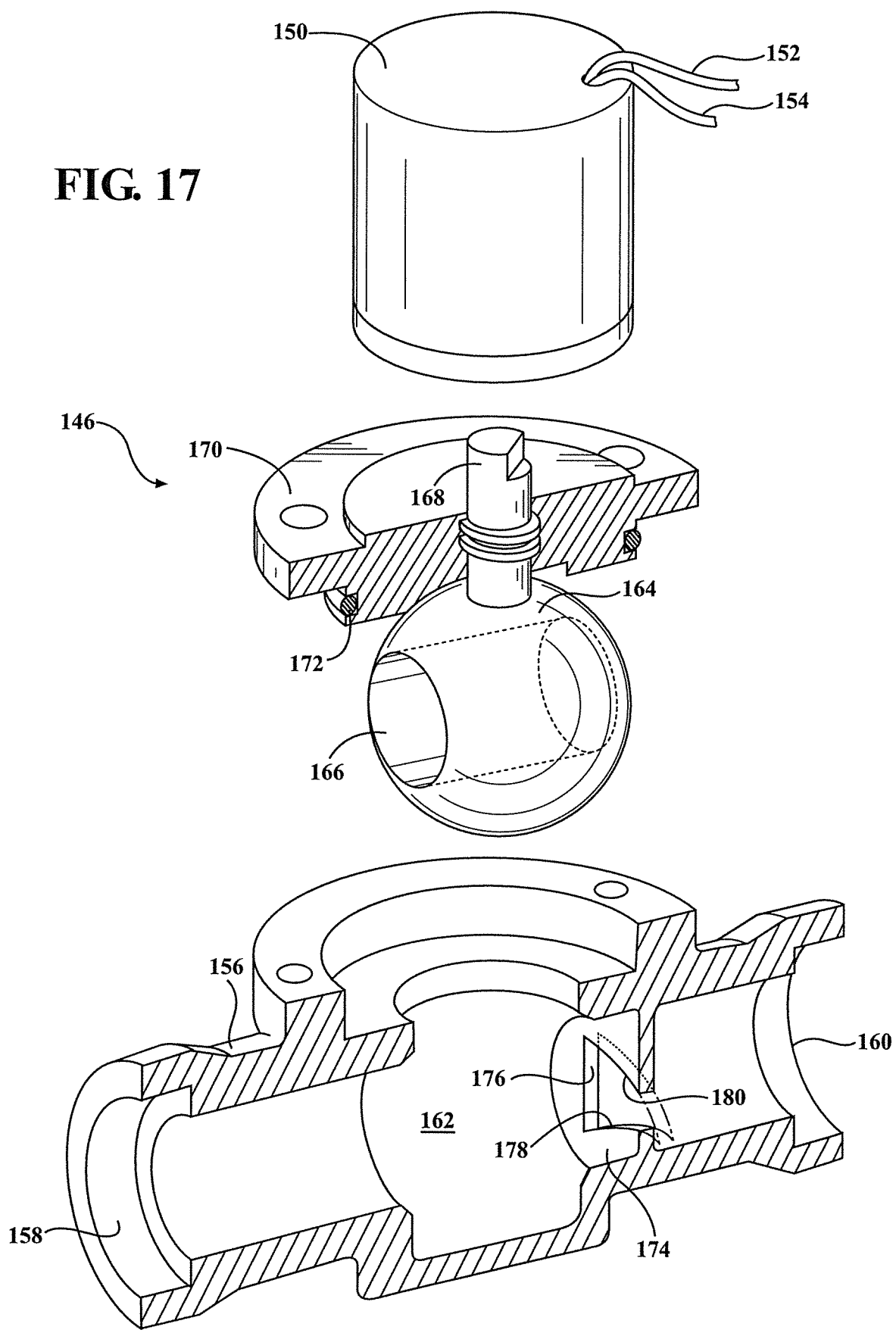
FIG. 17 is an exploded view of a variable flow restricting orifice in the form of a ball valve subassembly, such further illustrating a pseudo-triangular shaped opening at an outlet side for regulating/adjusting up to a hundred percent of an outlet flow rate (coefficient) over such as thirty percent of the valve outlet surface area.
Figure 22:
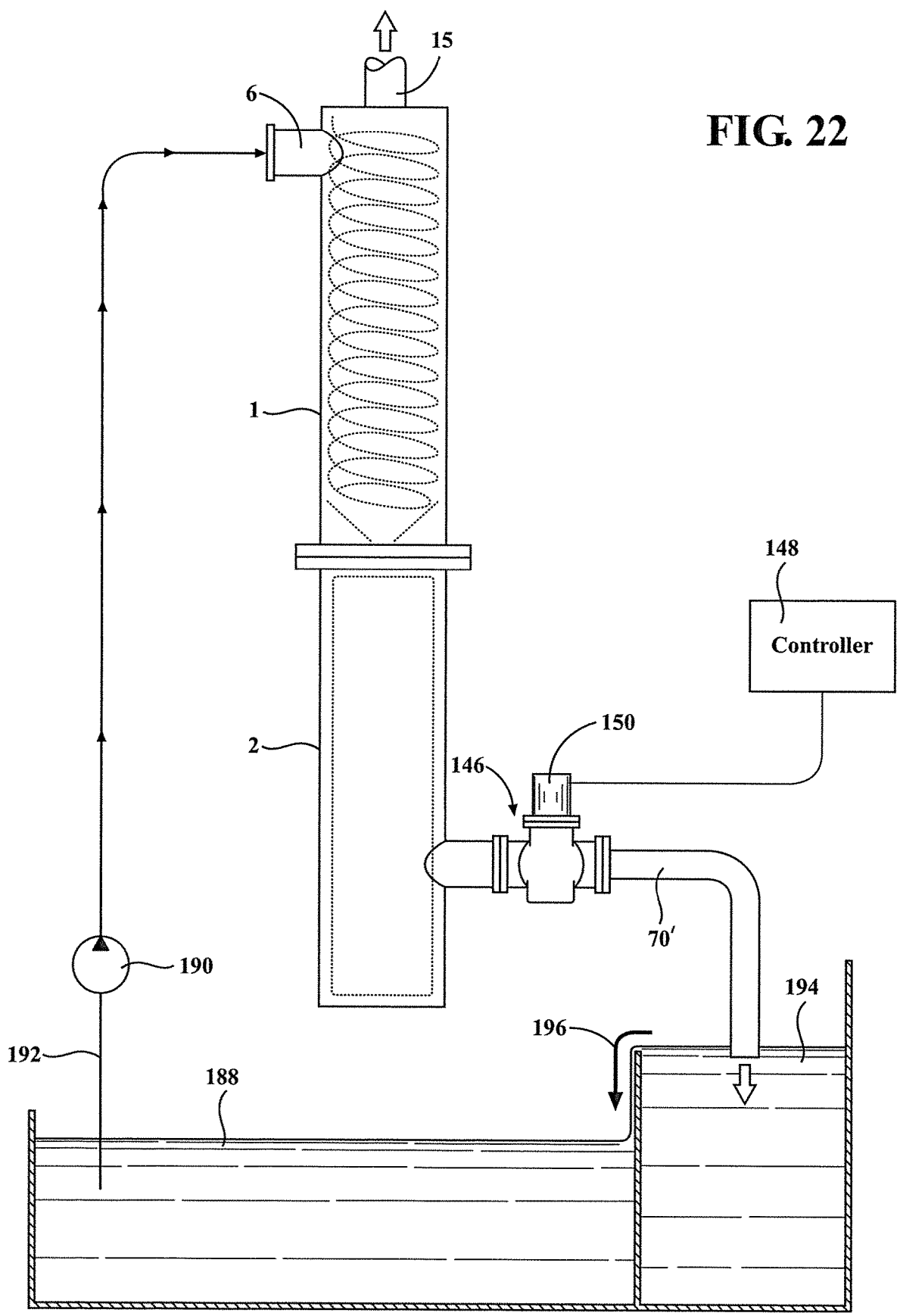
FIG. 22 is a diagrammatic plan view of a two stage filtration assembly as generally shown in FIG. 1 with first upper stage centrifugal separator and second lower stage baffle filter.

Proceeding now to FIG. 17 is an exploded view is provided of a variable flow restricting orifice in the form of a ball valve subassembly, generally at 146, which is integrated into a variant 70' of the second stage clean outlet. As further shown in FIG. 22, a diagrammatic plan view is provided of a two stage filtration assembly as generally shown in FIG. 1 with first upper stage centrifugal separator and second lower stage baffle filter, and in which a separate controller 148 is utilized for actuating the ball valve, this via rotary inducing cap element 150 which is connected to the controller 148 via any of wiring 152/154 or, alternately a wireless (not shown) arrangement.

A main housing 156 for the ball valve assembly includes first 158 and second 160 ends for integrating into the second stage clean outlet 70' (again FIG. 22) and includes a circular central seating area (spherical surface 162) for receiving a rotating ball 164 exhibiting a cylindrical through channel 166. The ball further includes an upper extending shaft 168 and, in combination with a fluidly sealing upper support seat 170 having an integrated ring seal 172, is mounted to an underside of the cap element 150 so that the shaft 168 is actuated, via the controller 148 and cap element 150, to induce rotational movement of the ball 164.

As shown in FIG. 17, an outlet side of the ball valve includes a flow restricting profile in the form of a wall 174 within which is configured a generally or pseudo triangular shaped opening (see interconnected sides 176, 178 and 180) at an outlet side. Understanding that the triangular profile shown can be substituted for a wide variety of alternate polygonal shapes and other aperture patterns, the use of a triangular shaped aperture on the outlet side can be chosen in one non-limiting variant for regulating/adjusting up to a hundred percent of an outlet flow rate (coefficient) over such as thirty percent of the total valve outlet surface area (this further defined as the percentage of the two dimensional area of ball through channel 166 which overlaps that of the triangular profile.

FIG. 18A is a sectional plan view of the ball valve subassembly of FIG. 17 and better showing the overlapping profile established between the circular through channel in the ball and the triangular outlet in a fully opened configuration. FIG. 18B is a further sectional plan view of the subassembly in FIG. 17 and illustrating a partially open condition established between the overlapping profiles, this in order to maintain a higher degree of flow adjustable control to account for a minimal percentage of overlapping surface area (e.g. such as again 30%) corresponding to a fully flow permitting condition.

As understood, and given the dynamic nature of fluids, a substantially full/open flow condition can be established between less than a full (defined as 100%) alignment between the overlapping apertures (ball channel 166 relative to triangular profile 176/178/180) and given the incrementing or decrementing rotation of the ball 164 which is required to define a percentage of overlapping alignment between the surfaces. In this manner, a higher degree of tuned flow adjustment is established, such as again over a minimal 30% of the overlapping surface area which will cover the fully range of interconnected fluid flow.

Referring again to FIG. 21, an exploded view is shown of the baffle filter, see also overall subassembly as depicted at 16 in FIG. 4B. As previously described, the baffle filter in one non-limiting version incorporates a pleated cross sectional shaped sleeve constructed of the desired filtering media 78, this contained within an apertured outer cylindrical housing (see again apertures 80 establishing the outer support housing.

An attachable disk shaped top 182 of the housing has an aperture (see inner rim wall 184) for receiving the dirty fluid from the bottom orifice (see again FIGS. 4-4B) separating the upper stage separator from the lower stage baffle filter. A likewise disk shaped bottom 186 of the cylindrical housing is closed, this in order to cause the debris entrained within the dirty fluid to be captured within an interior of the pleated baffle filter sleeve 78, concurrent with through flow of the fluid for delivery to the second stage clean outlet (see again FIG. 19). As further understood, the pleated nature of the filter sleeve results in maximizing the surface contact area with the dirty fluid and provides increased capture volume for the aggregrating debris (shavings, etc.,).

Figure 23A:
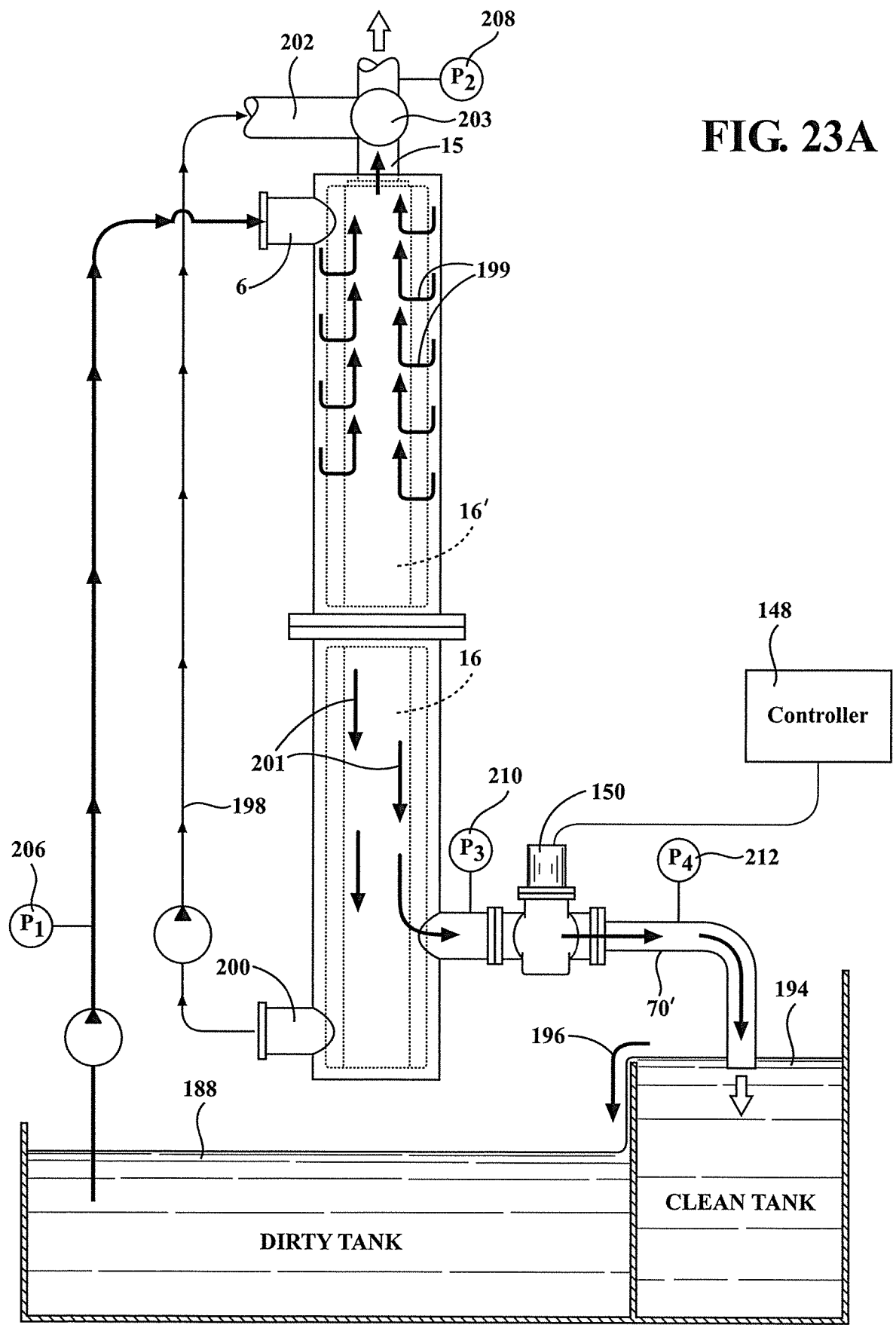
FIG. 23A a diagrammatic plan view of a variant of a two stage filtration assembly with the first stage centrifugal separator replaced by an additional first stage baffle filter, the assembly being shown in a normal flow filtering condition however further including a backwash/purge cycle.

Proceeding now to FIG. 23A a diagrammatic plan view is shown of a variant of a two stage filtration assembly with the first stage centrifugal separator (see also FIG. 22) replaced by an additional first stage baffle filter, see at 16', the assembly being shown in a normal flow filtering condition however further including a backwash/purge cycle. A first dirty reservoir 188 (see also FIG. 22) supplies the dirty fluid flow to the first stage separator (see also pump 190) located within conduit 192 rising from dirty reservoir 188 to first stage dirty inlet 6. Without limitation, the inlet 6 can be tangentially mounted to the first stage housing or vessel 1.

A second clean reservoir 194 is located astride the dirty reservoir 188 and is supplied by the second stage clean outlet 70'. As further shown, an overflow from the clean reservoir 194 can recombine with the dirty reservoir 188 (see further directional arrow 196).

Figure 23B:
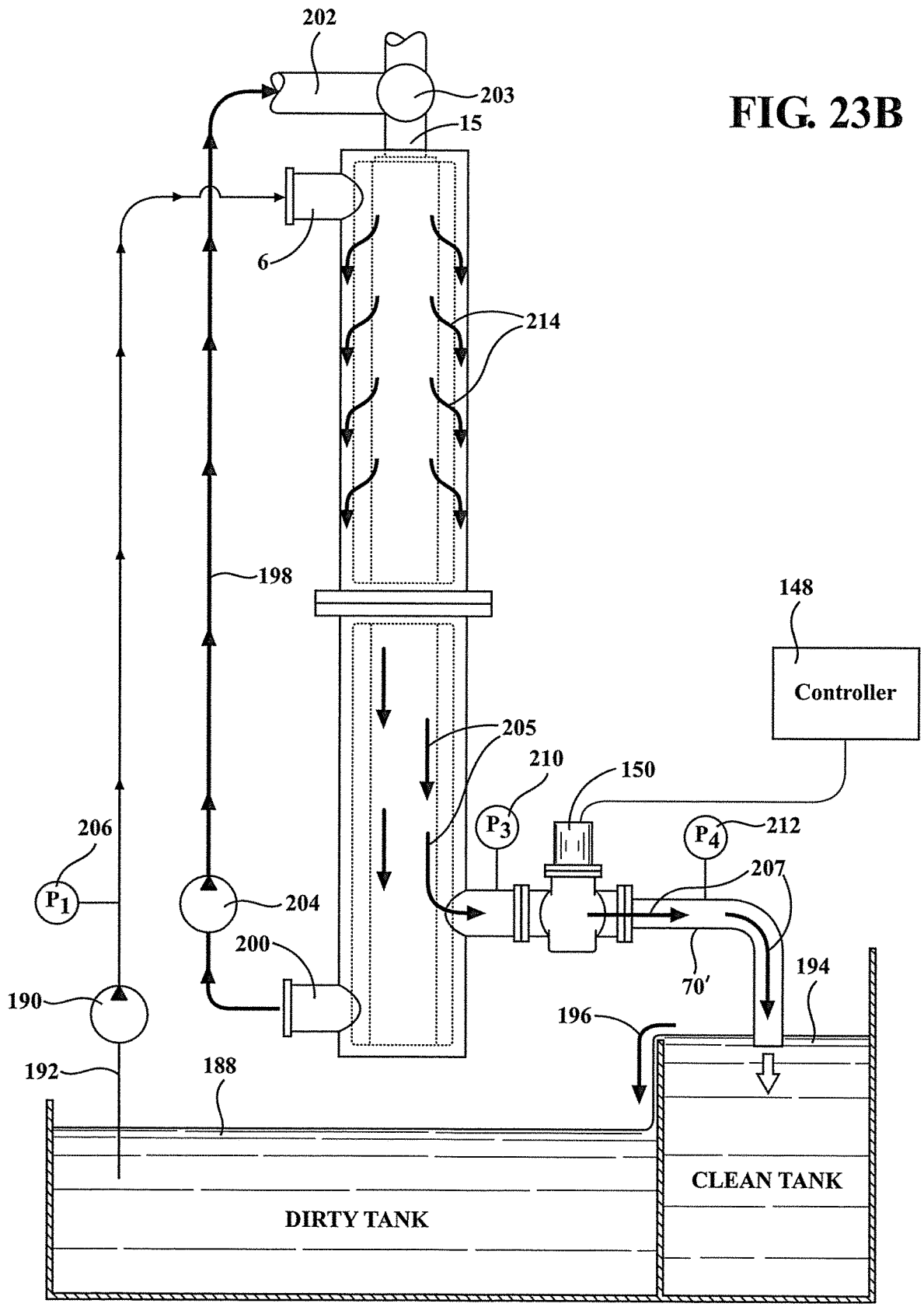
FIG. 23B is a succeeding view to FIG. 23A and illustrating the normal filter flow in a closed position, with the backwash/purge cycle activated for cleaning the upper stage baffle filter.

As further shown, the upper stage separator in the alternate embodiment of FIGS. 23A-23B substitutes the centrifugal first stage separator with the second filter 16', it being understood that the filtering assembly is capable of operating with a variety of different first stage filtration/debris separating options not limited to centrifugal/vortex operating assemblies or or baffle/pleated style filters. As will be further described, the second filter 16' can also include a permanent (defined as backwash-able) filter element which can vary from that associated with the second stage pleated and high capacity solids/baffle filter 16.

As further shown, a backwash line 198 extends from a second outlet 200 in the lower stage baffle filter and to a second inlet 202 in the upper stage separator which is defined by a branch extension to the first clean outlet 15 in communication with a three way backwash valve 203. During the normal operation of FIG. 23A, the backwash line is closed and fluid filtering flow proceeds in the previously described fashion (see further first stage outflow clean outflow at 199 and second stage clean outflow at 201).

Referring further to FIG. 23B, and when it is desired to backwash the upper stage filter 16' (such as again further including in one non-limiting variant a permanent filter element of some type which can also vary from the pleated and replaceable filter subassembly 16), the normal fluid flow is interrupted by shutting off the pump 190 providing fluid flow from the dirty tank/reservoir 188 to the first stage dirty inlet 6. Upon interruption of filtering fluid flow, activation of the backwash line 198 (via turning on further integrated pump 204) causes internally collected fluid from the second stage vessel to be re-delivered to the clean outlet branch 202 and, when driven in a reverse direction through the first stage permanent/back-washable filter 16' (see arrows 214), to backwash the upper stage filter and to discharge the dirty contents through the second stage clean outlet as shown by additional directional arrows 205 and 207.

Referring again to each of FIGS. 22, 23 and 23A, the second stage clean fluid outlet further exhibits pipe 70' extending into said clean reservoir through which the outflow 207 containing the backwashed first stage collected debris contents are delivered. Upon completion of the purge cycle, the backwash pump 204 is deactivated, the line 198 closed, and power to the normal fluid flow pump 190 resumed for two stage filtering.

FIGS. 23A-23B illustrate a typical fluid pressure profile existing within the two stage assembly and which, in one non-limiting example, includes a first stage inlet pressure for the dirty water to be in a range of 0-7 PSID (pounds per square inch, differential) for P1 (at 206 where dirty water is intake into line 192) and P2 (at 208 where it is exhausts from the first upper stage clean outlet 15). A third stage clean outlet pressure P3 (at 210 integrated into line 70' upstream from variable flow restrictor orifice assembly) is further desired to be maintained in a range of 0-30 PSID in a constant relationship with P1, whereas a further outlet pressure location P4 (at 212 also within line 70' downstream the variable restrictor orifice assembly) is further maintained constant with P1-P3.

By the above example, and upon P1:P2=7 PSID, the three way backwash valve 203 is actuated to divert flow in a backwash operation to clear the upper/first stage permanent filter element. Further, and upon P1:P2=30 PSID (gradient has now exceeded an acceptable limitations) the second stage sludge filter 16 needs to be changed.

Through experimentation, it has been determined that maintaining a flux rate gradient of within 20 psi across the entire system in respect to fixed orifice variants, as well as down to 0 psi gradient in combination with highly tuned variable flow restrictor orifices, will deliver adequate operation to the two stage filter assembly, and in particular to the needs of the second stage high capacity solid filter through which excessive flux/flow rate will result in premature clogging of the aggregating debris against the filtration media inner walls.

Figure 23C:
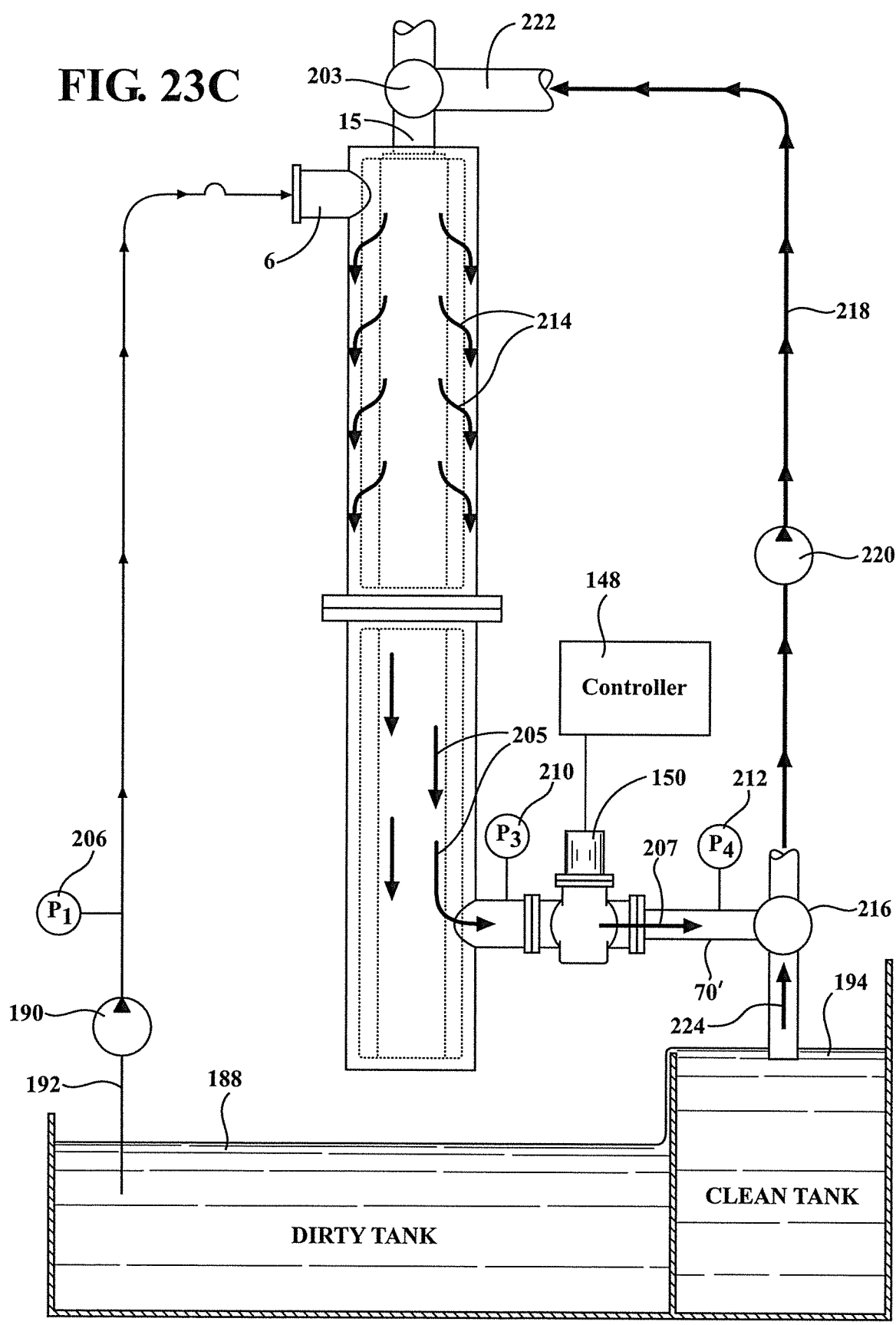
FIG. 23C is an alternate view to FIG. 23B and showing a reconfiguration of the system for providing an alternate clean fluid backwash/purge cycle.

Finally, FIG. 23C is an alternate view to FIG. 23B and showing a reconfiguration of the system for providing an alternate clean fluid backwash/purge cycle. By the example of FIG. 23, the backwash or purge line 198 is removed. In its place, a further three way valve 216 is integrated into the second stage clean outlet 70' and from which upwardly extends a relocated conduit or purge line 218.

A pump 220 is located within the purge line 218 which extends to an inlet location 222 associated with the three way valve 203 previously shown. Upon switching from the normal fluid flow condition of FIG. 23A (such as which is understood for purposes of this variant to be reconfigured to mirror the bypass structure depicted in FIG. 23C), the pump 220 is activated to draw clean fluid 224 from the reservoir 194 for delivery to the inlet location 222 associated with the three way valve 203.

As with the cycle described in FIG. 23B, fluid introduced at inlet 222 backwashes the upper stage filter and discharges the dirty contents through the second stage clean outlet as shown by additional directional arrows 205. The purged backwash flow may then be delivered back to the reservoir 194, such as following switching the three way valve 216 back to its initial flow position or, alternatively, additional piping (not shown) can be integrated into the backwash cycle for delivering the purged (dirty) backwash fluid into the dirty tank/reservoir 188.

It is further understood that the bypass arrangements of FIGS. 23B and 23C can be adjusted within according to the abilities of one in the ordinary skill in the art in order to establish the desired flow gradients to ensure proper balance of fluid flow during the backwash/purge cycle. Without limitation, it is also envisioned that the bypass configurations shown and described herein can also be utilized in combination with the second stage duplex arrangement of filters (see FIGS. 8-9B) and it is further understood that additional modifications or alternative configurations are envisioned for providing backwash selectively or concurrently through either or both of the second stage filters so constructed.

Having described my invention, other and additional preferred embodiments will become apparent to those skilled in the art to which it pertains, and without deviating from the scope of the appended claims.

I claim:

1. A dual stage filter assembly for use in a fluid cleaning and sludge removal operation, comprising:
    a first stage separator incorporated into a first vessel and receiving a dirty fluid flow, said first stage separator further including an upper stage separator;
    a first stage clean fluid outlet extending from said separator;

a second stage filter incorporated into a second vessel in fluidic communication with a dirty fluid outlet of said first stage separator for subsequent filtering and outflow through a second stage clean outlet, said second stage filter further including a lower stage baffle filter in fluidic communication with said upper stage separate via a convex collection element configured at a lower section of said upper stage separator for facilitating delivery of the dirty fluid outlet to an underneath situated funnel and, subsequently, for passage through a bottom orifice separating said upper stage separator from said lower stage baffle filter; and a flow restrictor incorporated into said second stage clean outlet for controlling a flow rate through said filter in order to prevent clogging of the same by aggregating debris.

2. The filter assembly as described in claim 1, said first stage separator further comprising a centrifugal separator, said first stage clean outlet further including an ascending pipe extending from said centrifugal separator and evacuating a clean fluid flow resulting from a negative pressure created within said upper separator.

3. The filter assembly as described in claim 1, said collection element and funnel being incorporated into a slide out removable section associated with said upper stage separator.

4. The filter assembly as described in claim 3, further comprising an outer spaced apart pair of annular projecting plates associated with a vertically supported portion of said upper stage separator, an inner spaced apart pair of plates incorporating a removable cylindrical portion containing said collection element and funnel and being releasably secured between said outer plates by upper and lower circumferentially arrayed bolt and nut fasteners.

5. The filter assembly as described in claim 1, said flow restrictor further comprising a fixed orifice in said second stage clean outlet.

6. The filter assembly as described in claim 5, said fixed orifice further comprising any of a re-entrant tube, sharp-edged, square-edged or well-rounded configurations.

7. The filter assembly as described in claim 1, said flow restrictor further comprising a variable orifice in said second stage clean outlet.

8. The filter assembly as described in claim 7, said variable orifice further comprising of a ball valve subassembly.

9. The filter assembly as described in claim 8, further comprising a triangular shaped opening at an outlet of said ball valve subassembly incorporated into said second stage clean outlet, actuated rotation of a ball incorporated into said ball valve subassembly via an operatively communicated controller resulting in incrementing or decrementing of an overlap established between a through channel of said ball and said triangular shaped opening for regulating an outlet flow rate over less than 100% of a maximum valve outlet surface area.

10. The filter assembly as described in claim 1, said baffle filter further comprising a pleated cross sectional shaped sleeve contained within an apertured outer cylindrical housing, a top of said housing having an aperture for receiving the dirty fluid from said bottom orifice separating said upper stage separator from said lower stage baffle filter, a bottom of said cylindrical housing being closed to cause the debris entrained within the dirty fluid to be captured within an interior of said baffle filter sleeve concurrent with through flow of the fluid for delivery to said second stage clean outlet.

11. The filter assembly as described in claim 1, further comprising a first dirty reservoir supplying the dirty fluid flow to said first stage separator, a second clean reservoir supplied by said second stage clean outlet.

12. The filter assembly as described in claim 11, further comprising said first and second reservoirs being combined into an overall reservoir with an overflow from said clean reservoir recombining with said dirty reservoir.

13. The filter assembly as described in claim 1, said upper stage separator further comprising a second filter, a backwash line extending from a second outlet in said lower stage baffle filter and supplying a second inlet in said upper stage separator and, upon interruption of filtering fluid flow, activation of said backwash line causing fluid from said second stage to backwash said upper stage second filter and to discharge said dirty contents through said second stage clean outlet.

14. The filter assembly as described in claim 11, said second stage clean fluid outlet further comprising a pipe extending into said clean reservoir.

15. The filter assembly as described in claim 13, further comprising a first pump incorporated into an inlet line for supplying the filtering dirty fluid flow.

16. The filter assembly as described in claim 13, further comprising a second pump incorporated into said backwash line.

17. A dual stage filter assembly for use in a fluid cleaning and sludge removal operation, comprising:
an upper stage separator incorporated into a first vessel and receiving a dirty fluid flow;
a first stage clean fluid outlet extending from said upper stage separator;
a second lower stage baffle filter incorporated into a second vessel in fluidic communication with a dirty fluid outlet of said first upper stage separator via a convex collection element configured at a lower section of said upper stage separator for facilitating delivery of the dirty fluid outlet to an underneath situated funnel and, subsequently, for passage through a bottom orifice separating said upper stage separator from said lower stage baffle filter for subsequent filtering and outflow through a second stage clean outlet; and
a flow restrictor incorporated into said second stage clean outlet for controlling a flow rate through said filter in order to prevent clogging of the same by aggregating debris, said flow restrictor further including a fixed orifice exhibiting any of a re-entrant tube, sharp-edged, square-edged or well-rounded configuration.

18. A dual stage filter assembly for use in a fluid cleaning and sludge removal operation, comprising:
an upper stage separator incorporated into a first vessel and receiving a dirty fluid flow;
a first stage clean fluid outlet extending from said upper stage separator;
a second lower stage baffle filter incorporated into a second vessel in fluidic communication with a dirty fluid outlet of said first upper stage separator via a convex collection element configured at a lower section of said upper stage separator for facilitating delivery of the dirty fluid outlet to an underneath situated funnel and, subsequently, for passage through a bottom orifice separating said upper stage separator from said lower stage baffle filter for subsequent filtering and outflow through a second stage clean outlet; and
a flow restrictor incorporated into said second stage clean outlet for controlling a flow rate through said filter in order to prevent clogging of the same by aggregating debris, said flow restrictor further including a variable orifice in said second stage clean outlet.

19. The filter assembly as described in claim 18, said variable orifice further comprising of a ball valve subassembly, a triangular shaped opening at an outlet of said ball valve subassembly incorporated into said second stage clean outlet, actuated rotation of a ball incorporated into said ball valve subassembly via an operatively communicated controller resulting in incrementing or decrementing of an overlap established between a through channel of said ball and said triangular shaped opening for regulating an outlet flow rate over less than 100% of a maximum valve outlet surface area.

* * * * *